(12) United States Patent
Dietz

(10) Patent No.: US 11,257,333 B2
(45) Date of Patent: Feb. 22, 2022

(54) INPUT DEVICE, AUTOMATED TELLER MACHINE AND METHOD

(71) Applicant: Wincor Nixdorf International GmbH, Paderborn (DE)

(72) Inventor: Oliver Dietz, Borchen (DE)

(73) Assignee: Wincor Nixdorf International GMBH, Paderborn (DE)

( * ) Notice: Subject to any disclaimer, the term of this patent is extended or adjusted under 35 U.S.C. 154(b) by 91 days.

(21) Appl. No.: 16/486,364

(22) PCT Filed: Feb. 6, 2018

(86) PCT No.: PCT/EP2018/052928
§ 371 (c)(1),
(2) Date: Aug. 15, 2019

(87) PCT Pub. No.: WO2018/146086
PCT Pub. Date: Aug. 16, 2018

(65) Prior Publication Data
US 2020/0175823 A1 Jun. 4, 2020

(30) Foreign Application Priority Data
Feb. 13, 2017 (EP) .................................... 17155853

(51) Int. Cl.
*G06Q 40/00* (2012.01)
*G07F 19/00* (2006.01)
*G06Q 20/10* (2012.01)

(52) U.S. Cl.
CPC .......... *G07F 19/20* (2013.01); *G06Q 20/1085* (2013.01)

(58) Field of Classification Search
CPC .... G06Q 20/1085; G07F 19/20; G07F 7/1033
See application file for complete search history.

(56) References Cited

U.S. PATENT DOCUMENTS

| 8,556,168 | B1 | 10/2013 | Lewis | |
| 2004/0134980 | A1* | 7/2004 | Flood | G07F 19/205 235/379 |
| 2004/0178263 | A1* | 9/2004 | Jones | G07D 11/40 235/381 |
| 2006/0243328 | A1* | 11/2006 | Bessmertny | E21B 47/06 137/487.5 |

(Continued)

FOREIGN PATENT DOCUMENTS

WO 2017004832 A1 1/2017

OTHER PUBLICATIONS

European Search report for corresponding application EP17155853.9, dated Feb. 28, 2020, written in German language.

(Continued)

*Primary Examiner* — Thien M Le
(74) *Attorney, Agent, or Firm* — Black, McCuskey, Souers & Arbaugh, LPA

(57) ABSTRACT

An input device has a support that has a user control area and that has a coupling area for coupling an object to be monitored to the input device; an electromechanical transducer structure that is coupled both to the user control area and to the coupling area; and a control apparatus that uses the electromechanical transducer structure to implement a user control function of the user control area and further to implement mechanical integrity monitoring of the object to be monitored and/or the support.

18 Claims, 12 Drawing Sheets

(56) References Cited

U.S. PATENT DOCUMENTS

| | | | |
|---|---|---|---|
| 2011/0155026 A1* | 6/2011 | Villiger | G07D 11/26 |
| | | | 109/40 |
| 2012/0000255 A1* | 1/2012 | Nave | E05G 1/04 |
| | | | 70/63 |
| 2013/0091589 A1* | 4/2013 | Shiakallis | G06F 21/81 |
| | | | 726/34 |
| 2013/0127755 A1 | 5/2013 | Lynn | |
| 2013/0276914 A1* | 10/2013 | Kritzman | F04B 19/006 |
| | | | 137/485 |
| 2014/0318425 A1* | 10/2014 | Mccafferty | E05G 1/02 |
| | | | 109/23 |
| 2017/0017344 A1 | 1/2017 | Kuribayashi et al. | |
| 2019/0196981 A1* | 6/2019 | Silvert | G06F 3/0622 |

OTHER PUBLICATIONS

International Search Report filed in the corresponding European Application; 14 pages.
Office Action issued in the corresponding Chinese application, dated Feb. 8, 2021, written in the Chinese language.
Translation of the Office Action issued in the corresponding Chinese application, dated Feb. 8, 2021.
Office Action filed in the corresponding Chinese Application dated Aug. 23, 2021; 9 pages (written in the Chinese language).
Office Action filed in the corresponding Chinese Application dated Aug. 23, 2021; 16 pages (translated to English).
94(3) Communication Filed in the Corresponding European Application Written in the German Language; 8 Pages.

\* cited by examiner

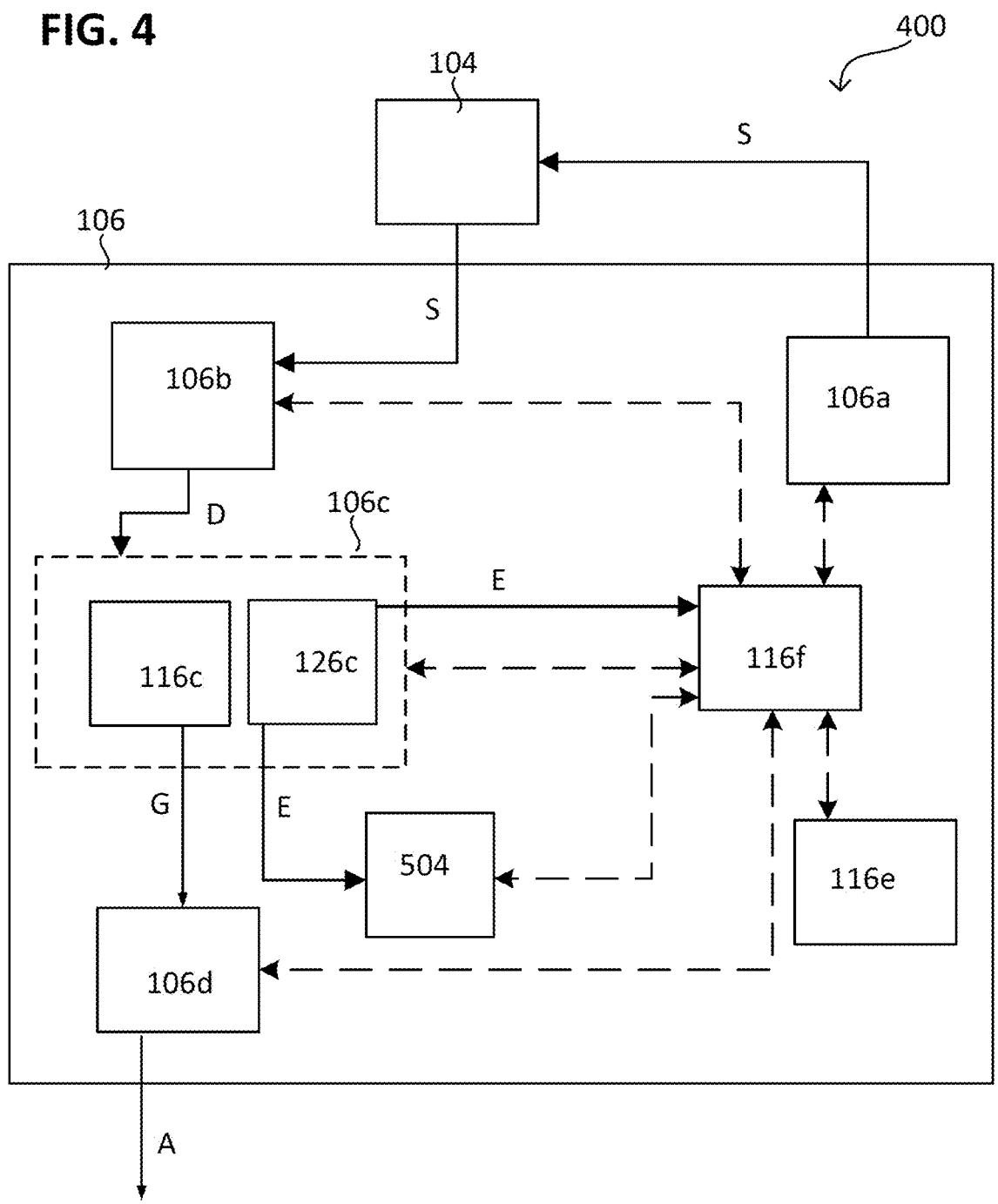

FIG. 10
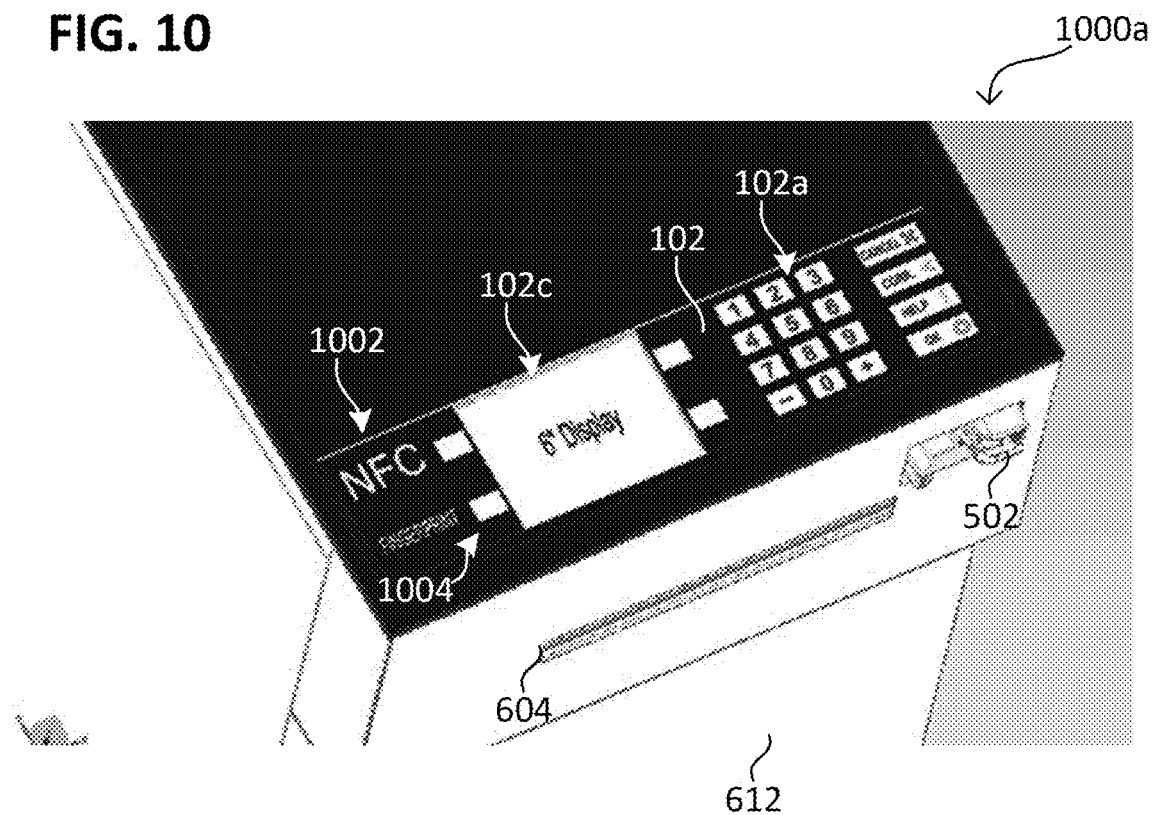
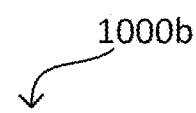
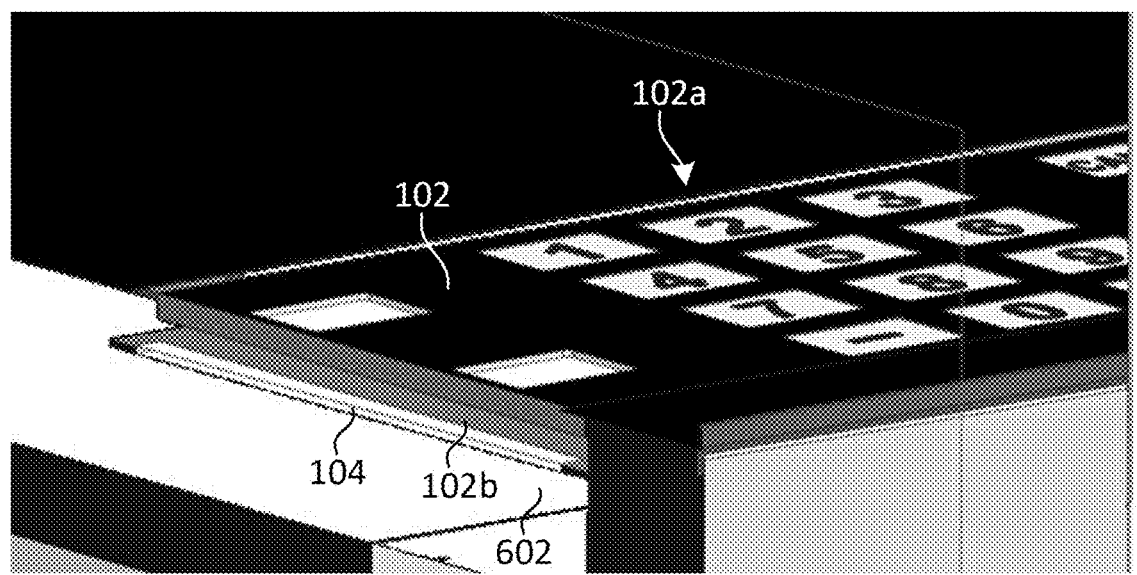

INPUT DEVICE, AUTOMATED TELLER MACHINE AND METHOD

CROSS-REFERENCE TO RELATED APPLICATIONS

This application is the US national stage entry of application PCT/EP2018/052928, filed Feb. 6, 2018, and which claims priority to and the benefit of EP17155853.9.

BACKGROUND AND SUMMARY

The invention relates to an input device, an automated teller machine and a method.

In general, self-service terminals can be used in order to provide a user with various goods in an automated manner, e.g. when the user requests said goods at the self-service terminal. By way of example, a self-service terminal can have an automated teller machine at which the user can pay in or withdraw banknotes independently and can perform other banking transactions.

The goods (e.g. banknotes) can be held in a reservoir of the self-service terminal. Owing to its content, the reservoir may be of particular interest for criminal activities aiming to acquire its content. The risk of the device becoming a target for unauthorized access increases with the value of its content. However, such a self-service terminal can be protected against external access only with difficulty owing to the circumstance that it is meant to be accessible (i.e. is exposed) to the user.

Conventionally, such a self-service terminal is protected by means of particular security precautions. Conventionally, such a self-service terminal is connected to a multiplicity of different sensors detecting vibrations, temperature or other environmental conditions. This increases the costs and sophistication. Alternatively or additionally, a video capture system is used in order to shed light upon unauthorized access. This is unable to prevent unauthorized access per se, however.

For a similar reason, an input device of the self-service terminal, which the user uses to input his request, can become a target for manipulation that is meant to intercept data input by the user, for example. These data can be used to gain access to an account of the user. Conventionally, such an input device is additionally provided with hardware-based protection that is meant to detect and/or prevent manipulation. This again increases the costs and sophistication, however.

According to various embodiments, an input device, an automated teller machine and a method are provided that, at low cost and with little sophistication, allow a user input to be captured and at the same time monitoring of the exposed object or parts thereof to be performed.

For the purposes of illustration, the sensors of the input device are used to perform monitoring (also referred to as integrity monitoring) of the self-service terminal at the same time. By way of example, the sensors, in a sensor mode, can capture an input provided at the input device and, in an actuator mode, can cause mechanical excitation of the self-service terminal, the response to which mechanical excitation permits conclusions about the state of the self-service terminal or of the input device. In the same manner, the input device can be used to monitor the state of another object connected to the input device.

According to various embodiments, an input device can have the following: a support that has a user control area and that has a coupling area for coupling an object to be monitored to the input device; an electromechanical transducer structure that is coupled both to the user control area and to the coupling area; a control apparatus that (e.g. in a first mode of operation) uses the electromechanical transducer structure to implement a user control function of the user control area and (e.g. in a second mode of operation) to further implement mechanical integrity monitoring of the object to be monitored and/or the support.

According to various embodiments, the control apparatus (e.g. a measuring circuit of the control apparatus) may be configured to provide data by means of the electromechanical transducer structure; wherein the provided data (e.g. in the first mode of operation) are used to implement the user control function and (e.g. in the second mode of operation) to implement the integrity monitoring.

According to various embodiments, the control apparatus (e.g. an excitation circuit of the control apparatus) may be configured to (e.g. in the second mode of operation) mechanically excite the object to be monitored and/or the support; wherein the integrity monitoring is effected on the basis of a response to the mechanical exciting; wherein the control apparatus is configured (e.g. the measuring circuit of the control apparatus) to use the transducer structure to capture the response and/or (e.g. the excitation circuit of the control apparatus) to use the transducer structure to mechanically excite the support.

According to various embodiments, the control apparatus (e.g. an evaluation circuit of the control apparatus) may be configured to take data provided by means of the electromechanical transducer structure as a basis for forming a monitoring variable, representing a result of the integrity monitoring, in accordance with a formation rule (e.g. in accordance with a summation).

According to various embodiments, the data can represent a multiplicity of measurements (e.g. measured values) from a predefined period, e.g. a multiplicity of responses.

According to various embodiments, the control apparatus may be configured to detect damage and/or manipulation to/of the object to be monitored and/or the support when a result of the integrity monitoring satisfies a predefined criterion.

According to various embodiments, the control apparatus (e.g. an alarm circuit of the control apparatus) may be configured to output an alarm signal when the integrity monitoring has been used to detect damage and/or manipulation to/of the object to be monitored and/or the support.

According to various embodiments, the control apparatus can have a data memory that is configured to store a profile that has at least one variable parameter; wherein the integrity monitoring is effected in accordance with the profile.

According to various embodiments, the control apparatus (e.g. the evaluation circuit of the control apparatus) may be configured to (e.g. in the first mode of operation) use the electromechanical transducer structure to capture an input at the user control area and to provide data representing the input.

According to various embodiments, the transducer structure may be configured to convert an external influence on the user control area into an electrical output variable (e.g. into an electrical signal in the time domain); wherein the control apparatus is configured to ascertain a spatial and/or temporal characteristic (e.g. the time and/or an input area) of the external influence on the basis of (e.g. a temporal characteristic) the electrical output variable.

According to various embodiments, the control apparatus may be configured to capture the input by detecting an influence on the user control area (e.g. a touch or a mechanical force) and/or the spatial characteristic of said influence (e.g. the position thereof) and/or the temporal characteristic of said influence (e.g. the speed thereof) in the user control area by means of the transducer structure.

According to various embodiments, the input device can further have: a card reading apparatus; and a processing circuit; wherein the processing circuit is configured to provide encrypted processing of the data representing the input and to correlate said processing with data provided by the card reading apparatus.

According to various embodiments, the electromechanical transducer structure can have an electromechanical transducer or multiple electromechanical transducers. The multiple electromechanical transducers can provide a sensor array, for example.

According to various embodiments, the electromechanical transducer structure can feature an electromechanically active material; wherein the electromechanically active material is (e.g. monolithically) integrated in the support and/or coupled to the latter (e.g. adhesively bonded or printed).

According to various embodiments, the electromechanically active material can be piezoelectric.

According to various embodiments, the support can feature at least one from the following: glass, plexiglass, silicon oxide, metal and/or plastic, for example polymethylmethacrylate.

According to various embodiments, an automated teller machine can have the following: a storage container for holding (in other words taking or storing) a means of payment (for example bills, coins, cheques or the like); a transfer unit for transferring a means of payment to the storage container or from the latter; an input device according to various embodiments, wherein the storage container is coupled to the coupling area of the input device. Optionally, the input device may be configured to communicate with the transfer unit, e.g. to control it.

According to various embodiments, an automated teller machine can have the following: a storage container for holding (in other words taking or storing) means of payment (for example bills, coins, cheques or the like); a transfer unit for transferring means of payment to the storage container or from the latter; a user interface, an electromechanical transducer structure that is coupled both to the storage container and to the user interface; a control apparatus that (e.g. in a first mode of operation) uses the electromechanical transducer structure to implement a user control function of the user interface and (e.g. in a second mode of operation) to implement mechanical integrity monitoring of the storage container and/or the user interface.

The user interface can have the user control area and optionally a display area.

According to various embodiments, the input device can further have: a support in which at least part of the user interface is integrated; wherein the support covers one side of the object to be monitored and/or is coupled to said side.

According to various embodiments, a method for operating an electromechanical transducer structure coupled both to a user control area and to an object to be monitored can involve the following: actuating the electromechanical transducer structure (e.g. in a first mode of operation), wherein the electromechanical transducer structure is used to implement a user control function of the user control area; actuating the electromechanical transducer structure (e.g. in a second mode of operation), wherein the electromechanical transducer structure is used to implement integrity monitoring of an object to be monitored. Optionally, changeover between the first mode of operation and the second mode of operation can take place.

According to various embodiments, a non-volatile data memory can have code segments that, when executed by a processor, carry out a method according to various embodiments.

According to various embodiments, an electromechanical transducer structure can be used to implement a user control function and the same electromechanical transducer structure can be used to implement mechanical integrity monitoring.

According to various embodiments, a method for operating an electromechanical transducer structure configured to convert an external influence on a user control area into an electrical output variable (e.g. an electrical signal in the time domain) can involve the following: capturing the electrical output variable; ascertaining features (e.g. present in the time domain) of the electrical output variable; comparing the features with features of a plurality of time domain reference signals (e.g. with data records, each data record from which associates an input area of the user control area, e.g. a spatial correspondence of the user control area, with the features of a time domain reference signal); and ascertaining, on the basis of the comparing, an input area at which the influence has taken place (e.g. ascertaining input event data representing a position and/or a time of the influence on the user control area).

According to various embodiments, a method for operating an electromechanical transducer structure that is configured to convert an external influence on a user control area into an electrical output variable (e.g. an electrical signal in the time domain) can involve the following: outputting information representing a reference input area (e.g. the position thereof) at which the user control area is meant to be influenced (also referred to as reference input); capturing the electrical output variable in the time domain (e.g. the waveform of said output variable); storing the electrical output variable as a time domain reference signal, wherein each time domain reference signal represents a reference input into a respectively associated input area of the one or more input areas.

Optionally, the method can involve the following: ascertaining features of the time domain reference signal.

Optionally, the method can involve the following: storing a data record that associates the input area (e.g. a spatial correspondence of the user control area in accordance with the position thereof) with the features of the time domain reference signal or with said time domain reference signal itself.

According to various embodiments, an input device can have the following: a user control area; an electromechanical transducer structure configured to convert an external influence on the user control area into an electrical output variable; a control apparatus configured to perform a method according to various embodiments.

According to various embodiments, the electromechanically active material can be transparent.

According to various embodiments, the transducer structure can (e.g. in the first mode of operation) provide the user control area with a sensor array, e.g. a touch-sensitive sensor array (also referred to as a touchpad).

According to various embodiments, the automated teller machine can further have: a housing that has a transfer opening for dispensing and/or taking a means of payment (e.g. cash, such as banknotes and/or coins, or other paper-based value carriers).

According to various embodiments, the automated teller machine can further have: a storage container in the housing for holding means of payment.

According to various embodiments, the automated teller machine can further have: a transfer unit for transferring means of payment between the transfer opening and the storage container.

According to various embodiments, an input device can have the following: a user control area having one or more input areas; an electromechanical transducer structure configured to convert an external influence on the user control area into an electrical signal in the time domain (e.g. over the course of time) (or vice versa); an ascertainment device configured to use comparing of the electrical signal with a plurality of time domain reference signals to ascertain an input area into which an input has been provided, wherein each time domain reference signal represents a reference input into a respectively associated input area of the one or more input areas.

According to various embodiments, a method for operating an input device may have been or can be provided, wherein the input device has: a user control area having one or more input areas; an electromechanical transducer structure that is configured to convert an external influence on the user control area into an electrical signal in the time domain (or vice versa); wherein the method involves: capturing the electrical signal; comparing the electrical signal with a plurality of time domain reference signals; ascertaining, by means of the comparing, an input area into which an input has been provided, wherein each time domain reference signal represents a reference input into a respectively associated input area of the one or more input areas.

The ascertainment device can have the control apparatus and/or at least parts thereof, such as for example at least the measuring circuit and the evaluation circuit.

Exemplary embodiments of the invention are depicted in the figures and are explained more specifically below.

BRIEF DESCRIPTION OF THE DRAWINGS

In the figures,

FIG. 3A, FIG. 3B, FIG. 3C and FIG. 4 each show an input device according to various embodiments in a schematic circuit diagram;

FIG. 10 shows the automated teller machine from FIG. 9 in various views;

DETAILED DESCRIPTION

Figure 1A:
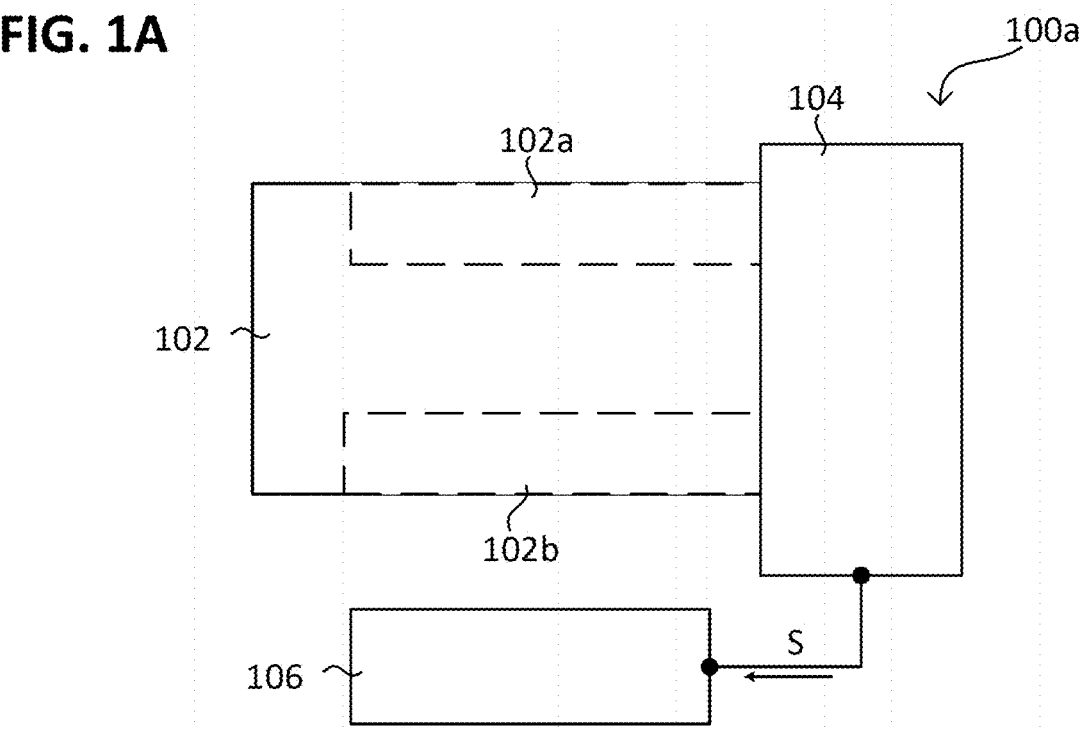
FIG. 1A, FIG. 1B and FIG. 2A each show an input device according to various embodiments in a schematic side view or cross-sectional view.

In the detailed description that follows, reference is made to the accompanying drawings, which form part of said description and show for illustration purposes specific embodiments in which the invention can be implemented. In this regard, direction terminology such as, for example, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various illustrative embodiments described herein can be combined with one another, unless specifically indicated otherwise. Therefore, the detailed description that follows should not be interpreted in a restrictive sense, and the scope of the protection of the present invention is defined by the appended claims.

Within the context of this description, the terms "connected", "coupled" are used to describe both a direct and an indirect connection (e.g. resistive and/or electrically conductive, e.g. an electrically conductive connection, e.g. a connection capable of signal transmission) and a direct or indirect coupling. In the figures, identical or similar elements are provided with identical reference signs, in so far as this is expedient.

According to various embodiments, the term "coupled" or "coupling" can be understood in the sense of a (e.g. mechanical, hydrostatic, thermal and/or electrical), e.g. direct or indirect, connection and/or interaction. Multiple elements may be coupled to one another along a chain of interaction, for example. According to various embodiments, "coupled" can be understood in the sense of a mechanical (e.g. physical) coupling, e.g. by means of direct physical contact or by means of a coupling element. A coupling may be configured to transfer a mechanical interaction (e.g. force, torque, etc.).

According to various embodiments, an input device is provided. The input device can provide a user interface, for example, and/or be part of the latter. The user interface can additionally have, besides a user control area of the input device, by means of which a user input can be provided, a display area (e.g. having an electrical visualization system or a display surface), by means of which information can be provided (e.g. displayed) for the user.

The information can be provided for example by means of at least one (i.e. precisely one or more than one) light source (e.g. a lamp), at least one projector, at least one screen, at least one adjustable display panel, at least one force feedback system, a sonification system and/or by means of a software visualization system (e.g. actuating an electrical screen or projector) running on a terminal, for example.

According to various embodiments, an automated teller machine can also be referred to as a cash dispenser, banking machine, Bancomat or ATM. The automated teller machine can be understood as a technical device for self-service cash withdrawal (also referred to as a cash withdrawal machine), e.g. from a digital current or credit card account, which is effected by means of a debit card system, for example. Alternatively or additionally, the automated teller machine may be configured for self-service cash depositing (also referred to as a cash deposit machine), e.g. into a digital current or credit card account, which is effected by means of the debit card system, for example. By way of example, the automated teller machine may be configured for cash withdrawal and cash depositing in combination (also referred to more generally as transfer).

As an alternative or in addition to cash, the automated teller machine may also be configured for dispensing and/or taking other means of payment (transferable, standard and countable value carriers), such as for example securities, checks, bank transfer slips, etc.

According to various embodiments, an automated teller machine and/or an input apparatus for an automated teller machine are provided that has fitted e.g. a planar head unit on a safe. This head unit can have a low physical height (e.g. can be plate-like). The head unit (for the purposes of illustration the cover) can have a pane of glass that optionally merely extends over a user control area (e.g. in the area of user control elements) and/or is arranged therein. As an alternative to the pane of glass, other materials can also be used for the head unit, such as for example toughened plexiglass or tempered metal (e.g. steel or aluminium) or a plastic. The glass plate may have had or can have an electromechanical transducer structure, for example realized as one or more piezoelectric sensors and/or as one or more longitudinal strain gauges, arranged and/or mounted on it. For example the piezoelectric sensors may be applied in the form of patches (e.g. stickers) or in printed fashion. The piezoelectric sensors may be connected to an evaluation circuit and an excitation circuit. This sensor circuit arrangement can monitor the integrity of the head module and of the safe, for example. In addition, the sensor circuit arrangement can provide a touch functionality of a screen or a PIN input.

The depiction of a keypad and of function symbols (e.g. in selection fields) can optionally be provided by means of a screen or else by means of printing appropriate user control information (for example numbers, letters, symbols or the like) and also alternatively by means of a projecting method.

The integrity check can be effected by means of a summation method over defined periods, which is optionally able to be parameterized on the basis of the embodiment of the safe and the installation site. It can be used to effect an active integrity check by means of an actuator mode of a piezoelectric sensor with subsequent evaluation.

The same piezoelectric sensors can be used for operation of the automated teller machine by the device user (e.g. for capturing his input). Optionally, a PIN can be evaluated or decrypted, with the decryption of the sensor signals, derivation of stochastic features and definition of appropriate filters being able to be effected in the backend of the bank. Hardware-based additive security for the EPP unit may not be absolutely necessary at the input device, for example. By way of example, the piezoelectric sensors detect any manipulation at the input device itself.

FIG. 1A illustrates an input device 100a according to various embodiments in a schematic side view or cross-sectional view (e.g. with the line of vision along a surface of a support 102).

The input device 100a can have the support 102, an electromechanical transducer structure 104 and a control apparatus 106.

The support 102 can have a first area 102a (also referred to as user control area 102a) and a second area 102b (also referred to as coupling area 102b). The user control area 102a and the coupling area 102b may be arranged for example at an interval from one another, e.g. on opposite sides of the support 102 and/or each having a surface section of the support 102. The coupling area 102b can have for example a mounting structure, e.g. having form-fit elements (such as holes, tabs or threads) and/or having a material-bond element (e.g. an adhesive surface).

The user control area 102a can have for example an input apparatus (e.g. a keypad and/or at least one selection field). Optionally, the appearance of the input apparatus (e.g. of some or any keys of the keypad and/or selection fields) may be alterable, as described even more precisely later on.

The transducer structure 104 may be coupled both to the user control area 102a and to the coupling area 102b, e.g. in direct physical contact with these. By way of example, a force acting on the user control area 102a and/or on the coupling area 102b can be transferred to the transducer structure 104.

The control apparatus 106 can (e.g. in a first mode of operation, e.g. in a sensor mode of operation) use the transducer structure 104 to implement a user control function of the user control area 102. In general, use can denote a (e.g. mechanical) influence that is transferred from a user to the user control area 102a. By way of example, the mechanical influence (for the purposes of illustration an instance of operation) can feature a force acting on the user control area 102a, a touch of the user control area 102a and/or an alteration (e.g. over time and/or in space) of the force or of the touch.

The providing of the user control function can be understood as a use (by the user) of the user control area 102a being detected and/or interpreted by the control apparatus 106 (i.e. the underlying input information being ascertained). Optionally, a response to the use may have been or can be provided, e.g. by virtue of the appearance, put another way the look, of the user control area 102a being altered and/or by means of a display area (cf. for example FIG. 7A).

According to various embodiments, the transducer structure 104 can have precisely one electromechanical transducer (e.g. sensor) or multiple electromechanical transducers.

The or each transducer of the transducer structure 104 can have a measuring transducer (e.g. a force signal converter) or be formed therefrom. A transducer can be understood as an apparatus that transforms (converts) an input variable into an output variable in accordance with a fixed relationship. The input variable can be of electrical energy type, for example, and the output variable can be of mechanical energy type, or vice versa (i.e. they can differ in their energy type). By way of example, the or each transducer may be configured for bidirectional transformation, i.e. can be operated both as a sensor and as an actuator.

The transducer structure 104, e.g. each electromechanical transducer of the transducer structure 104, may be configured to convert a mechanical signal S, e.g. an external influence (such as e.g. a force), into an electrical signal S or to transfer said mechanical signal onto said electrical signal (e.g. to modulate the electrical signal S). By way of example, the transducer structure 104 may be configured to respond to the use by generating or modifying an electrical signal S (the electrical signal S can represent the influence for the purposes of illustration). Alternatively or additionally, the transducer structure 104 (e.g. the present state thereof) can be ascertained by the control apparatus 106, e.g. by means of an electrical signal S (for the purposes of illustration a test signal) that is applied to the transducer structure 104 (also referred to as reading). The electrical signal S generated or modified by the transducer structure 104 (also referred to as sensor signal S) can have a signal characteristic (e.g. an amplitude/time characteristic, e.g. a voltage/time characteristic) that represents the influence.

According to various embodiments, the control apparatus 106 may be configured to ascertain a spatial characteristic and/or temporal characteristic of the influence, as described even more precisely later on, e.g. on the basis of the signal characteristic. The control apparatus 106 may be configured for example to ascertain and/or process the signal characteristic of each transducer of the transducer structure 104. For the purposes of illustration, a touch of the user control area 102*a* at a particular position (x, y) can give rise to a sensor signal S characteristic of the position (x, y), which sensor signal can be captured and optionally interpreted by the control apparatus 106.

In addition to the user control function, the control apparatus 106 can implement mechanical integrity monitoring of the object to be monitored and/or the support, e.g. in a second mode of operation (e.g. an actuator mode of operation).

The integrity monitoring (also referred to as intactness monitoring) can be understood, for the purposes of illustration, as the control apparatus 106 checking whether there is damage and/or manipulation to/of the object to be monitored and/or the support 102. In other words, the control apparatus 106 may be configured to detect damage and/or manipulation to/of the object to be monitored and/or the support 102. The monitoring can feature for example focused observation and information collection about the state and/or about an alteration of the object to be monitored and/or the support 102 and/or the interpretation of said alteration.

For the purposes of illustration, in contrast to the user control function, the integrity monitoring can be used to ascertain whether an influence on the support or on the object to be monitored has led to the permanent (e.g. irreversible) alteration thereof. For the purposes of illustration, it is possible for example to detect whether the support has got a crack or the object to be monitored has got a dent. Optionally, the alteration can be categorized as damage and/or manipulation when it satisfies a prescribed criterion, as described even more precisely later on.

The first mode of operation and the second mode of operation can optionally be performed in succession, and/or it is possible to change over between them.

Figure 1B:
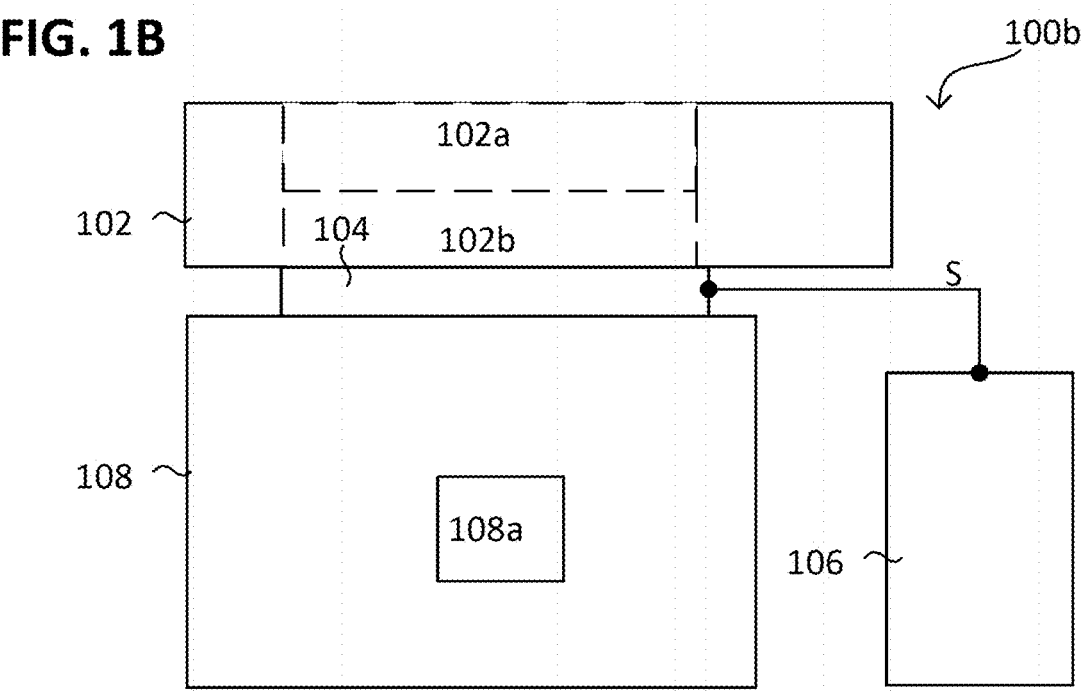

FIG. 1B illustrates an input device 100*b* according to various embodiments in a schematic side view or cross-sectional view (e.g. with the line of vision along a main surface of a support 102).

According to various embodiments, the object 108 to be monitored may be coupled to the coupling area 102*b*, e.g. mounted thereon. By way of example, they may be coupled to one another by means of a form fit (e.g. screwed) or a material bond (e.g. adhesively bonded).

By way of example, the object 108 to be monitored may be coupled to the support 102 by means of the transducer structure 104. It is then possible for at least part of the transducer structure 104 to be arranged between the object 108 to be monitored and the support 102, with the transducer structure 104 being able to be fitted to the support.

The object 108 can have, for the purposes of illustration, an independent device whose integrity is meant to be monitored, or may be formed therefrom. By way of example, the object 108 can have a storage container for holding one or more goods.

Optionally, the object 108 to be monitored can have an electrical component 108*a* (e.g. an electrical circuit, motor or the like) that is electrically conductively coupled to the control apparatus 106. By way of example, the control apparatus 106 may be configured to communicate with the electrical component 108*a*, e.g. to actuate it. By way of example, the object to be monitored can have an electrical apparatus or may be formed therefrom.

Figure 2A:
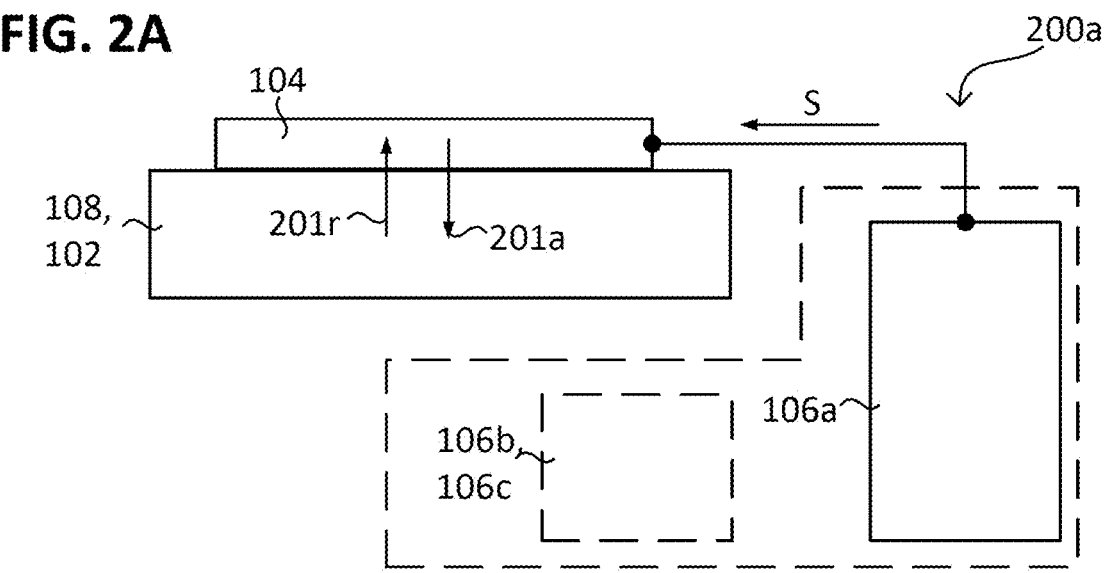

FIG. 2A illustrates an input device 200*a* according to various embodiments in a schematic side view or cross-sectional view (e.g. with the line of vision along a main surface of a support 102 or the object 102).

According to various embodiments, the control apparatus 106 can have an excitation circuit 106*a*. The excitation circuit 106*a* may be configured to mechanically excite 201*a* the object 108 to be monitored and/or the support 102 by means of the transducer structure 104.

For the purpose of excitation, the excitation circuit 106*a* can transmit an electrical signal S (also referred to as excitation signal S) to the transducer structure 104, e.g. a sinusoidal signal or another suitable signal type.

By way of example, the transducer structure 104 can be used to transfer a mechanical vibration 201*a* onto the object 108 to be monitored and/or the support 102. In that case, the transducer structure 104 can be operated as an actuator. The excitation circuit 106*a* can have a digital-to-analogue converter and/or an amplifier, for example.

In other words, the transducer structure 104 in the actuator mode of operation can transform an electrical input variable (e.g. an electrical signal) into a mechanical output variable (e.g. a force that is variable over time, for the purposes of illustration an oscillation or vibration) in accordance with the fixed relationship. By way of example, the transducer structure 104 can be put into a vibrating mode for the purposes of excitation 201*a*.

The integrity monitoring can be effected on the basis of a response 201*r* (also referred to as excitation response 201*r*, e.g. an echo oscillation) to the mechanical excitation 201*a*. In other words, the control apparatus 106 may be configured so as, e.g. after the excitation 201*a*, to use the transducer structure 104 to capture the response 201*r*, e.g. by means of a measuring circuit 106*b*, and/or to process said response, e.g. by means of an evaluation circuit 106*c*, as described even more precisely later on.

The response 201*r* can be captured for example by means of the sensor signal S (e.g. in a sensor mode of operation), as described above. Alternatively or additionally, the control apparatus 106 can use an additional sensor (e.g. a vibration sensor, a strain gauge) to capture the response 104*a*.

For the purposes of illustration, the excitation response 201*r* can have a characteristic (also referred to as response characteristic) that is dependent on the state of the object 108 to be monitored and/or the support 102. The response characteristic can correlate with a signal characteristic of the sensor signal S, for example.

If the object 108 to be monitored and/or the support 102 are altered, e.g. by damage and/or manipulation, the response characteristic can change. On the basis of the change in the response characteristic (e.g. in comparison with one or more earlier responses 201*r*), it is possible for the alteration of the object 108 to be monitored and/or the support 102 to be inferred. By way of example, a large change in the response characteristic can be caused by severe damage and/or manipulation to/of the object 108 to be monitored and/or the support 102.

By way of example, the object 108 to be monitored and/or the support 102 may have been or can be excited 201a at one frequency or multiple frequencies (e.g. in accordance with an excitation spectrum). By way of example, the multiple frequencies can be swept. The capturing of the excitation response 201r can involve capturing an amplitude of the excitation response 201r for each frequency and/or assigning the amplitude a value, so that a response spectrum can be formed.

According to various embodiments, a change in the response characteristic can be assigned in each case to the object 108 to be monitored and the support 102 (as the origin). By way of example, the object 108 to be monitored and the support 102 can differ from one another in their resonant frequency and/or their resonance spectrum, so that the spectral components and/or the change therein can be used for distinction, i.e. of whether the support 102 or the object 108 is affected.

Figure 2B:
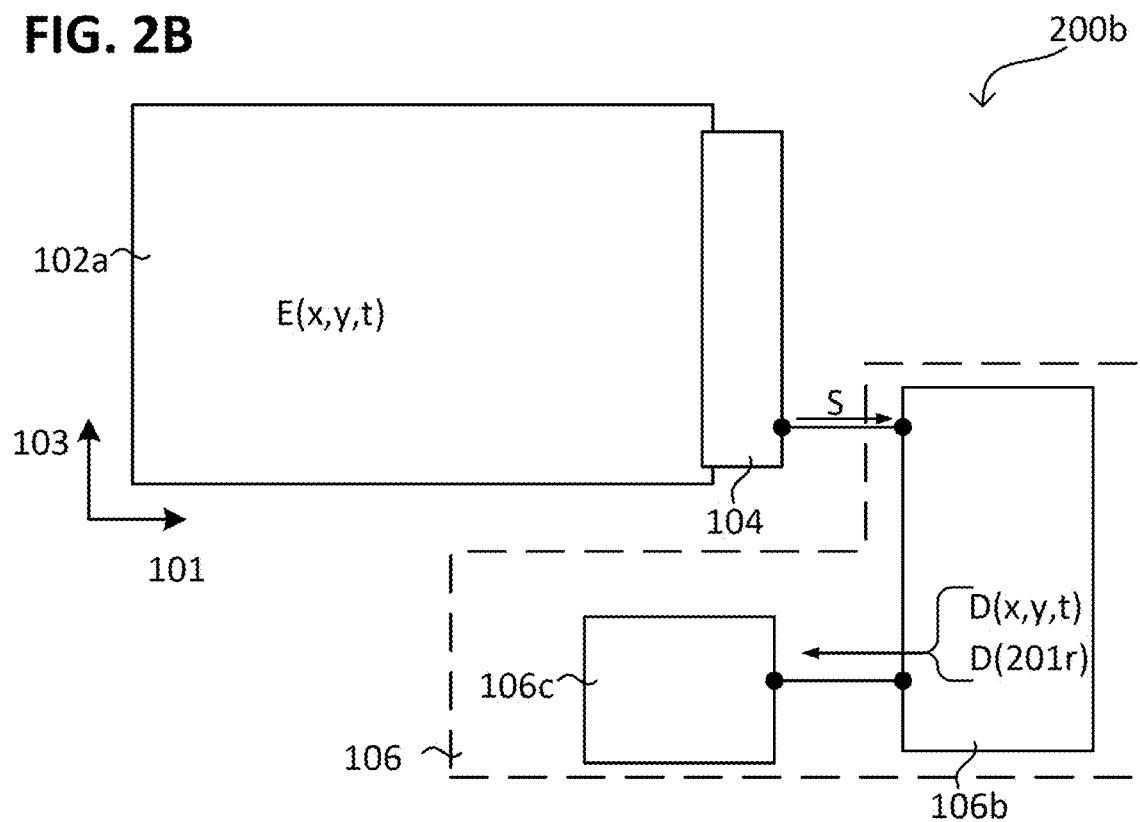
FIG. 2B shows an input device according to various embodiments in a schematic plan view or cross-sectional view.

FIG. 2B illustrates an input device 200b according to various embodiments in a schematic plan view or cross-sectional view (e.g. with the line of vision on the user control area 102a).

An influence originating from a user on the user control area 102a can involve for example a single event (e.g. pressing a key) that represents for example a simple input (e.g. a confirmation). Alternatively or additionally, the use can involve a series of events (for example related to one another) that represent a complex input (e.g. a multidigit number). Each event can have a spatial and/or temporal characteristic, e.g. a position at which and/or a length of time for which the influence takes place. The use can be understood as an influence for inputting information and/or for control and cannot develop a destructive action, for example.

According to various embodiments, the control apparatus 106 can have a measuring circuit 106b. The transducer structure 104 may be configured to respond to one or each event of the external influence E(x, y, t) on the user control area 102a by generating an electrical signal S (sensor signal S) or modifying said signal. The influence E(x, y, t) can have a spatial characteristic (x, y) and/or a temporal characteristic (t) (in general also referred to as characteristic).

The spatial characteristic, as well as calculation and/or mapping, can be provided for example on the basis of one or more coordinates of a coordinate system (e.g. a spherical coordinate system, a cylindrical coordinate system or a cartesian coordinate system), the coordinates being able to be converted between different coordinate systems (also referred to as coordinate transformation). By way of example, a coordinate (e.g. an angle, a period of time and/or a length) can be stretched or compressed. It therefore goes without saying that what is described herein is not restricted to rectangular cartesian coordinates, since any other suitable coordinate system obtained for example from a coordinate transformation or else from a similarity transformation can also be used in an equivalent or similar manner. The familiar and illustrative cartesian coordinates are used below for the purpose of better understandability.

The spatial characteristic (x, y) can be described by a first coordinate x, which references a position of the influence E(x, y, t) on the user control area 102a in a first spatial direction 101, and/or a second coordinate y, which references a position of the influence E(x, y, t) on the user control area 102a in a second spatial direction 103. The first direction 101 and the second direction 103 may be perpendicular to one another. The temporal characteristic (t) can be described by a temporal coordinate (e.g. a timestamp) representing the time and/or the duration of the influence E (x, y, t).

For the purposes of illustration, a time/space resolution (x,y,t) of the influence E(x, y, t) may have been or can be provided that reveals where for example a key is pressed, e.g. on the basis of a characteristic time response of the transducer structure 104 (e.g. of the sensor 104a or of the sensors 104a, 104b).

The measuring circuit 106b may be configured to capture the sensor signal S of the transducer structure 104 and to take the electrical sensor signal S as a basis for providing data D(x,y,t) representing the characteristic (x,y,t) of the influence E(x, y, t), e.g. position data D(x,y) that optionally have an associated timestamp (t), these also being referred to as input event data D(x, y, t) in general. By way of example, the signal characteristic of the sensor signal S can be captured and the signal characteristic can be taken as a basis for inferring the spatial characteristic (x, y) and/or the temporal (t) characteristic of the influence E(x, y, t), e.g. the regularity, position and/or duration thereof, e.g. by means of a comparison with reference data.

By way of example, the control apparatus 106 may be configured to ascertain a signal characteristic provided by the transducer structure 104 (characteristic of the sensor signal S), e.g. by means of signal processing. The signal processing can be effected for example by means of a transformation (e.g. a Fourier transformation), a filter, a pattern comparison, an autocorrelation or the like and can provide characteristic information, such as for example a pattern identifier, multiple features, a spectral distribution or the like.

The comparison can be effected for example by virtue of the temporal signal characteristic (i.e. the waveform) of the sensor signal S being compared with reference signals (also referred to as time domain reference signal), the temporal characteristic thereof and/or the characteristic information thereof, which are stored for example together with input event data D(x, y, t), e.g. in a manner linked thereto. The linking can assign each reference signal (or the temporal signal characteristic thereof) the input event data D(x, y, t) representing one or more spatial coordinates (x, y) and/or a spatial area (e.g. an input area of the user control area 102a), e.g. in accordance with a position grid.

Optionally, the assignment of the input event data D(x, y, t) (for the purposes of illustration location data and optional timestamp) can be trained. By way of example, the input device 200b can implement a training process by means of which the user is asked to influence a particular reference position of the user control area 102a (e.g. an input area thereof), an applicable sensor signal S caused by the user influence is captured and the characteristic information of the sensor signal S is linked to input event data D(x, y, t) representing the reference position. By way of example, it is thus possible for the functionality of and/or precision of the user control function to be improved without knowing a particular characteristic of the user control area 102a. The user control function can be implemented simply by means of the sensor signal S of precisely one transducer, for example. The use of multiple transducers can improve the accuracy of the user control function.

By way of example, the measuring circuit 106b can have an analogue-to-digital converter and/or a signal processing processor.

On the basis of the input event data D(x, y, t), it is possible for example for the user control function of the user control area 102a to be implemented, e.g. for it to have the user control function to ascertain the input information (entered information or instructions) of the user.

Optionally, the measuring circuit 106 may be configured (e.g. in the second mode of operation) to capture the excitation response 201r. In a manner analogous to the influence, the measuring circuit 106b may be configured to capture the electrical sensor signal S of the transducer structure 104 and to take the electrical sensor signal S as a basis for providing data D(201r) (also referred to as response data) representing the response characteristic 201r.

Optionally, the control apparatus 106 can have an evaluation circuit 106c, described more precisely below, to which the data D (the response data D(201r) and/or the input event data D(x, y, t)) are supplied.

Figure 3A:
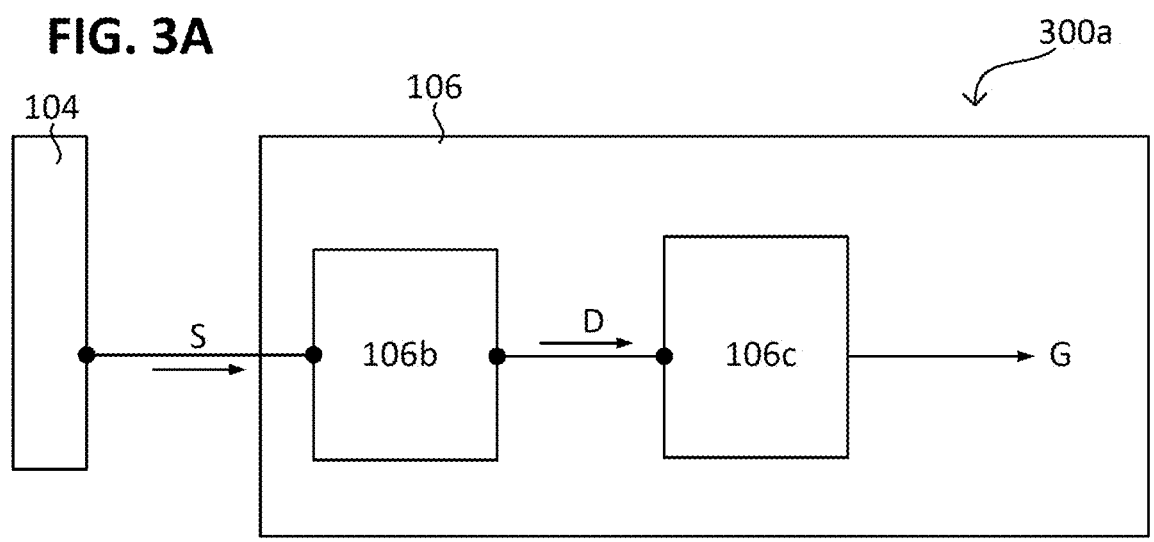

FIG. 3A illustrates an input device 300a according to various embodiments in a schematic circuit diagram.

According to various embodiments, the control apparatus 106 can have the evaluation circuit 106c. The data D provided by the measuring circuit 106b can be transmitted to the evaluation circuit 106c. The evaluation circuit 106c may be configured to use the data D (e.g. in the first mode of operation) to implement the user control function and/or (e.g. in the second mode of operation) to implement the integrity monitoring, e.g. in succession or at the same time.

To implement the integrity monitoring, the evaluation circuit 106c can form a monitoring variable G from the supplied response data D(201r), e.g. in accordance with a formation rule. The monitoring variable G can, for the purposes of illustration, represent a result of the integrity monitoring. If the monitoring variable G has a larger value, for example, the probability of there being damage and/or manipulation to/of the support 102 and/or the object 108 can be greater. By way of example, the response data D(201r) can be mapped onto the monitoring variable G by means of the formation rule.

By way of example, the response data D(201r) can represent a multiplicity of measurements from a predefined measurement period. The formation rule can combine the multiple measured values for example to produce the value of the monitoring variable G, e.g. by means of summation, averaging or the like.

Optionally, the evaluation circuit 106c can have a memory that is used to store the monitoring variable G, e.g. the trend therein over time and/or the change therein over time.

The predefined period, the formation rule and/or the number of measured values used to form the monitoring variable G may have been or can be defined and/or altered by means of a profile, for example, as described even more precisely later on.

Figure 3B:
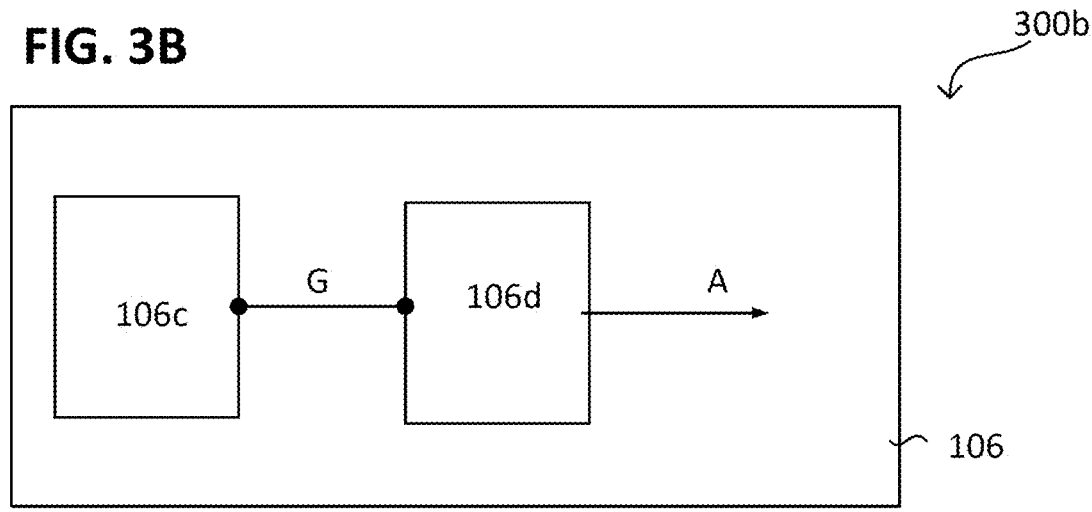

FIG. 3B illustrates an input device 300b according to various embodiments in a schematic circuit diagram.

According to various embodiments, the control apparatus can have an alarm circuit 106d.

The alarm circuit 106d may be configured to output an alarm signal A when the integrity monitoring has been used to detect damage and/or manipulation to/of the object 108 to be monitored and/or the support 102. By way of example, it is possible to detect when access to the inside of the object 108 is gained from outside and/or when the user control area 102a is manipulated (with the aim of intercepting data).

An alteration of the object 108 to be monitored and/or of the support 102 can be categorized for example as damage and/or manipulation when the monitoring variable G satisfies a predefined criterion. Alternatively or additionally, other measured variables (e.g. temperature, vibration, etc.) can be used in order to detect damage and/or manipulation.

The criterion can represent a threshold value, a range of values and/or a regularity. By way of example, the alarm signal A can be output when the monitoring variable G (e.g. the value thereof) exceeds a predefined threshold value and/or leaves a prescribed range of values. Alternatively or additionally, the alarm signal A can be output when the monitoring variable G (e.g. the value thereof) exceeds a predefined threshold value and/or leaves a prescribed range of values with a prescribed regularity.

The criterion (e.g. the threshold value, the range of values and/or the regularity) may have been or can be defined for example by means of a profile, as described even more precisely later on.

The alarm signal A can feature an audible alarm signal and/or a digital alarm signal or be formed therefrom. By way of example, a digital alarm signal A can be transmitted to a surveillance provider (e.g. a guard) that for example responds to the digital alarm signal A by performing a physical check on the input device 300b. Alternatively or additionally, an alarm siren A can be started that is meant to frighten off the causer of the damage and/or manipulation or at least make him aware that his action has become known.

Optionally, the alarm signal A can trigger further actions intended to protect the input device 300b. By way of example, the alarm signal A can trigger locking of the storage container (e.g. the door thereof).

Optionally, the alarm signal A can transmit information about the result of the integrity monitoring, e.g. the state of the object 108 to be monitored and/or the support 102, and/or about the surroundings (e.g. temperature data, video data, etc.).

Figure 3C:
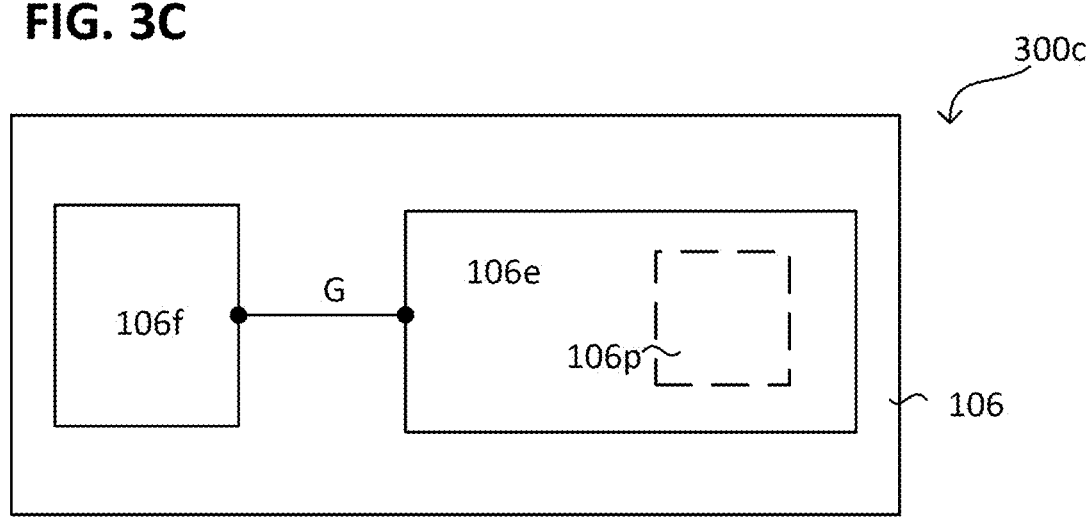

FIG. 3C illustrates an input device 300c according to various embodiments in a schematic circuit diagram.

According to various embodiments, the control apparatus 106 can have a computer-readable data memory 106e, e.g. a non-volatile data memory 106e, such as a hard disk, a flash drive, an optical data memory or the like. Optionally, the data memory 106e can have multiple segments that may be connected to one another by means of a network. By way of example, computer-readable code can be stored in the data memory 106e in accordance with a distributed scheme (e.g. a local scheme) and executed.

The data memory 106e can have for example a hard disk and/or at least one semiconductor memory (such as e.g. read-only memory, random access memory and/or flash memory) or be formed therefrom. The read-only memory can be for example an erasable programmable read-only memory (can also be referred to as EPROM). The random access memory can be a nonvolatile random access memory (can also be referred to as NVRAM).

The data memory 106e can be used to store a profile 106p that has at least one (i.e. precisely one or more than one) parameter. The at least one parameter can define for example the predefined period, the number of measured values, the formation rule (and/or parameters used therein) and/or the criterion.

According to various embodiments, the control apparatus 106 can have a processor 106f (for example implemented by means of one of the circuits 106a to 106d or separately therefrom) that is configured to alter one or more parameters of the profile 106p, e.g. in accordance with a user input (e.g. in a configuration process) at the user control area 102a or in accordance with a data transmission from outside. By way of example, the processor 106f can initiate a configuration process and/or the training process in which the input device 300c is ready for configuration or training, e.g. based on an authentication of an administrator.

This can allow the parameter(s) of the profile that are taken as a basis for effecting the integrity monitoring to be adapted, e.g. to suit an installation site of the input device 300c.

Optionally, the data memory 106e can be used to store for example the data D, code segments and/or the monitoring variable G, e.g. the trend therein over time.

FIG. 4 illustrates an input device 400 according to various embodiments in a schematic circuit diagram.

The control apparatus 106 can have: an excitation circuit 106a, a measuring circuit 106b, an evaluation circuit 106c and an optional processor 106f.

The evaluation circuit 106c can have a response evaluation module 116c and an input evaluation module 126c. The response evaluation module 116c may be configured to convert the response data D(201r) representing the excitation response 201r into the monitoring variable G. The input evaluation module 126c may be configured to take input event data D(x, y, t) representing the position of an influence E(x, y, t) on the user control area 102a as a basis for converting into input information E (also referred to as input data E) representing the information or instructions entered at the user control area 102a.

To this end, the input evaluation module 126c can access correlation data (which are stored in the data memory 106e, for example) bringing about a correlation of the input event data D(x, y, t) with applicable input information E, e.g. in accordance with menu guidance. By way of example, the correlation data can define the location in the user control area 102a at which a key (e.g. of an encrypting PIN keypad) or a selection field is arranged and, in accordance with an influence on the location, can provide input information E associated therewith. The converting of the input event data D(x, y, t) into the input information E may also be referred to as interpreting the input. The input information E can represent a numerical sequence entered at the keypad (e.g. numerical keypad), for example.

The input information E can be transmitted to the processor 116f, for example. In general, the processor can communicate with each of the circuits 106a to 106c (i.e. can exchange data and/or instructions). Alternatively, or additionally, the input information E can be transmitted to an optional processing circuit 504, which is described more precisely below.

Figure 5A:
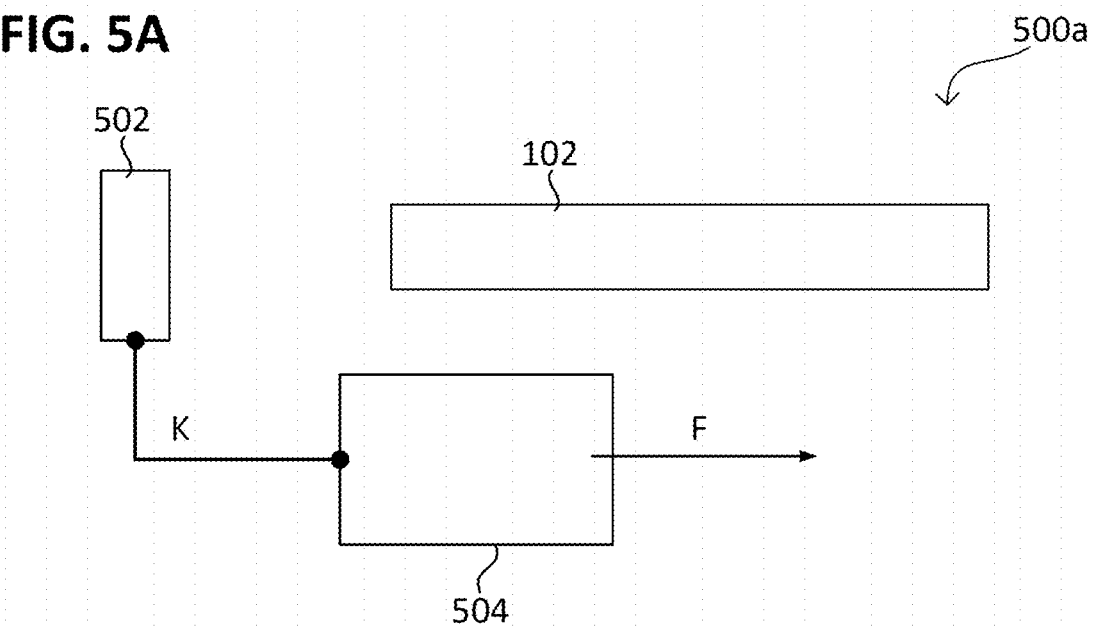
FIG. 5A and FIG. 5B show an input device according to various embodiments in a schematic side view or cross-sectional view.

FIG. 5A illustrates an input device 500a according to various embodiments in a schematic side view or cross-sectional view.

The input device 500 can have: a card reading apparatus 502 and a cryptographic processing circuit 504.

The card reading apparatus 502 (e.g. a chip card reader) may be configured to actuate a chip card held therein, e.g. in order to read data stored on the chip card or to supply information to the latter. The actuation can be effected by means of contact with the chip card, by means of which power signals are transmitted to the latter, and/or by means of near field communication (NFC). By way of example, the card reading apparatus 502 can have a transceiver system for near field communication (also referred to as a near field communication transponder). The card reading apparatus 502 can provide for example data K (also referred to as card data K) representing information stored on the chip card. The chip card can be used to authenticate a user (e.g. in conjunction with the input of a personal identification number), for example.

The processing circuit 504 may be configured to provide encrypted (cryptographic) processing of the input data E and to correlate (e.g. to compare) said processing with card data K provided by the card reading apparatus 502. The processing circuit 504 can provide basic functions for the secure data communication, such as for example cryptography, authentication and management of cryptology keys.

By way of example, the processing circuit 504 can compare the entered numerical sequence with the card data K and provide an enable signal F in the event of concordance. The enable signal F can indicate that the user has authenticated himself successfully, for example.

Figure 5B:
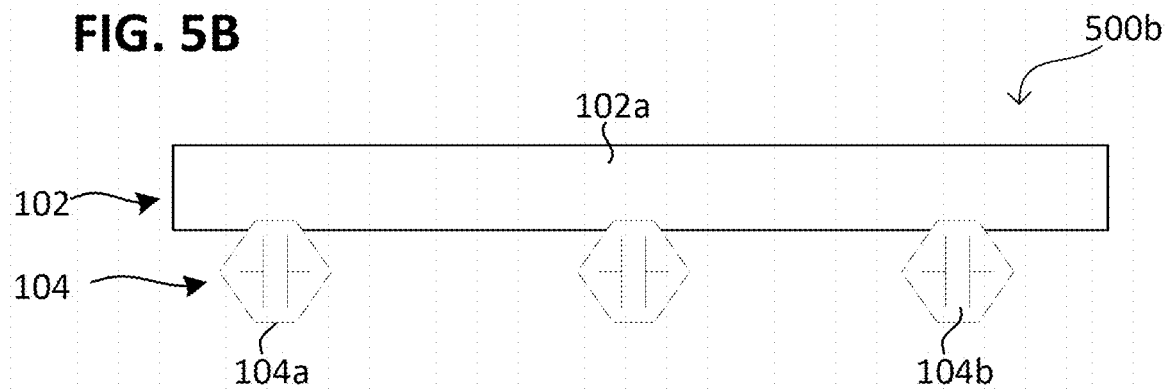

FIG. 5B illustrates an input device 500b according to various embodiments in a schematic side view or cross-sectional view.

The electromechanical transducer structure 104 can have at least one electromechanical transducer 104a, 104b, e.g. precisely one electromechanical transducer 104a or multiple electromechanical transducers 104a, 104b.

The at least one electromechanical transducer 104a, 104b can (e.g. in the first mode of operation) provide the user control area 102a with a sensor array by means of which a spatial characteristic and/or temporal characteristic of an influence on the user control area 102a can be ascertained.

The at least one electromechanical transducer 104a, 104b can feature an electromechanically active material (also referred to as active material), e.g. a piezoelectric material. The electromechanically active material can have the property of reacting to a deformation by generating an electrical field and/or the other way around (e.g. both). By way of example, a change in the electrical polarization and hence the occurrence of a voltage can occur at the active material when it is elastically deformed (e.g. direct piezoelectric effect). Conversely, the active material can deform when a voltage is applied (e.g. inverse piezoelectric effect).

The active material can feature for example a crystal structure that has no inversion centre.

According to various embodiments, the support 102, or at least the user control area 102a, may be plate-shaped and/or can feature a transparent material or be formed therefrom.

The transparent material, e.g. a transparent support material, can feature for example an oxide (such as e.g. quartz glass ($SiO_2$), titanium oxide ($TiO_2$) or sapphire ($Al_2O_3$)), a glass mixture (such as e.g. optical glass, aluminosilicate glass, alkali silicate glass, lead glass, phosphate glass, borate glass, crown glass or flint glass), a transparent fluoride (such as e.g. calcium fluoride ($CaF_2$) or magnesium fluoride ($MgF_2$)), a metal glass (such as e.g. amorphous metal or an amorphous metal alloy) or a transparent plastic (such as e.g. polycarbonate, polymethylmethacrylate or cyclic olefin (co) polymer). A transparent material can further feature a highly transparent glass or an alkali-free glass.

Optionally, the transparent material (e.g. glass) of the support 102, or at least of the user control area 102a, may be electromechanically active, e.g. piezoelectric.

Figure 6:
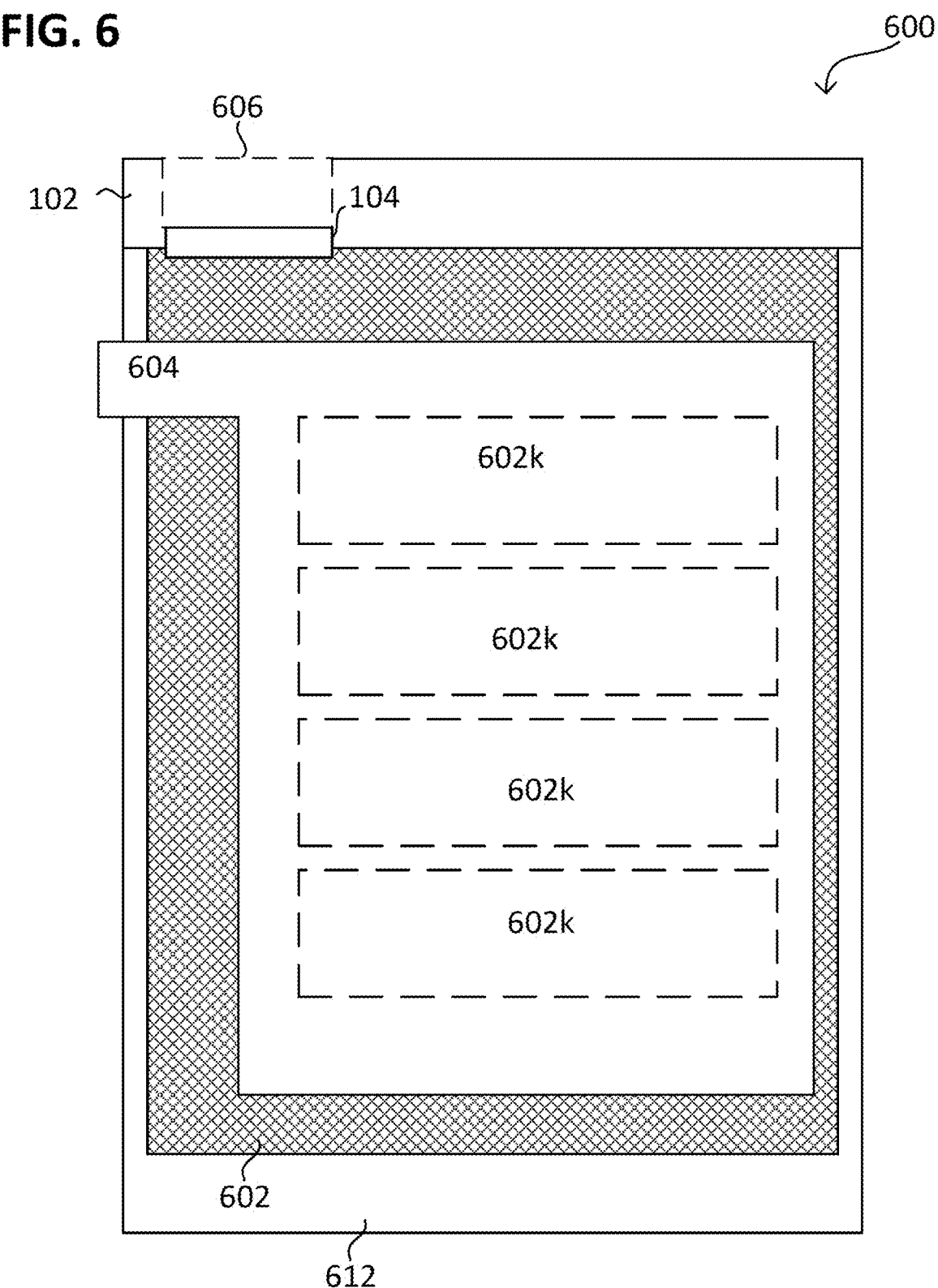
FIG. 6 shows an automated teller machine according to various embodiments in a schematic side view or cross-sectional view.

FIG. 6 illustrates an automated teller machine 600 according to various embodiments in a schematic side view or cross-sectional view.

The automated teller machine 600 can have a storage container 602, e.g. a security container 602. The means of payment stored (e.g. deposited or held for dispensing) in the automated teller machine 600 may have been or can be arranged and/or held in the storage container 602. The storage container 602 can have for example a safe or may be formed therefrom.

Depending on the security level, the storage container 602 can have a body and a lockable door, which are embodied with one or more walls, e.g. with a thickness of up to 20 centimeters. The walls of the body can feature steel (e.g. one or more steel plates) and can additionally feature an insulating material, particles, plastic, concrete or a combination of these (e.g. may be filled therewith between two steel plates of a wall of the body), depending on the required protection. The walls of the body may be formed in a structure that obstructs or cripples a burglary tool, for example by means of a concrete filling in which carborundum particles are embedded, or in which tempered steel tubes with a steel ball filling are embedded. Optionally, the body can feature a flame-retardant material.

According to various embodiments, the storage container 602 can have multiple cassettes 602k, each cassette 602k of which has had or has a means of payment of a type associated with the cassette 602k arranged in it, e.g. bills (banknotes) having a particular value.

Further, the automated teller machine 600 can have a transfer unit 604 for transferring means of payment to the storage container 602 or from the latter. The transfer unit 604 can further extend at least partly into the storage container 602.

The transfer unit 604 can have for example a deposit/dispensing module that is configured for example to singularize and present the means of payment (e.g. banknotes or other paper-based media). The transfer unit 604 can for example further have a transport apparatus configured to transport the means of transport in the automated teller machine 600 (e.g. the storage container 602). The transfer unit 604 can for example further have a sorting apparatus configured to take the type of the means of payment as a basis for sorting said means of payment, e.g. into the individual cassettes 602k, and/or stacking said means of payment.

Further, the automated teller machine 600 can have a user interface 606, as described even more precisely later on, and an electromechanical transducer structure 104, which is coupled both to the storage container 602 (e.g. the body thereof) and to the user interface 606.

Further, the automated teller machine 600 can have a control apparatus 106 (not depicted), as described above. The control apparatus 106 can use the electromechanical transducer structure 104 to implement a user control function of the user interface 606 and to implement mechanical integrity monitoring of the storage container 602 and/or the user interface 606.

The storage container 602 may optionally have been or can optionally be arranged in a housing 612 and/or may optionally have been or can optionally be supported on a substrate by means of a frame 612.

Figure 7A:
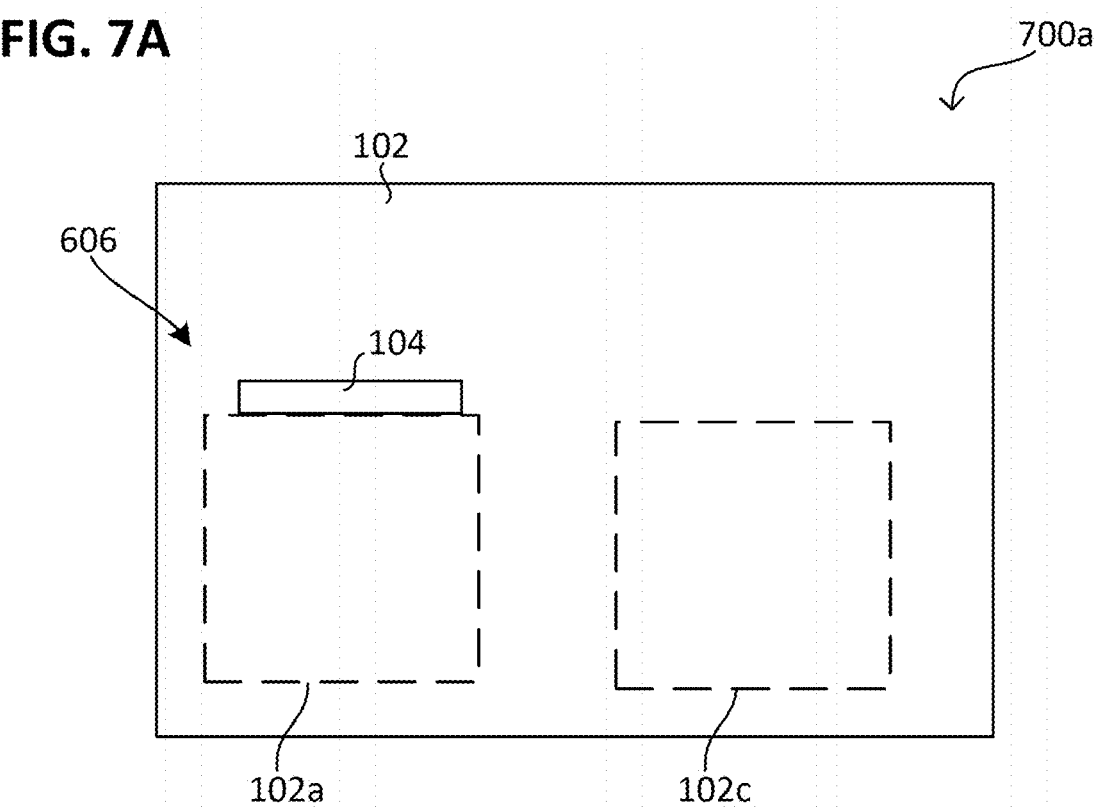
FIG. 7A shows an automated teller machine according to various embodiments in a schematic plan view or cross-sectional view.

FIG. 7A illustrates an automated teller machine 700a according to various embodiments in a schematic plan view or cross-sectional view (e.g. with the line of vision on the user control area 102a).

The automated teller machine 700a can have an input device according to various embodiments, as described above, for example input devices 100a to 500b, the user control area 102a of which provides at least part of the user interface 606.

The user interface 606 can have the user control area 102a and optionally at least one display area 102c. A or each display area 102c can have an electric screen, or be formed therefrom, for displaying information, e.g. a liquid crystal screen and/or a light-emitting diode screen.

By way of example, a first display area 102c may have been or can be arranged at an interval from the user control area 102a. Alternatively or additionally, the user control area 102a can have at least one signal lamp and/or at least one electric screen, these being able to implement a second display area 102a. By way of example, an appearance (external look) of the user control area 102a may be adjustable by means of the second display area, so that the appearance can be used to provide the user with information (e.g. a numerical field) and/or to alter the arrangement, characterization and/or number of selection fields. By way of example, the appearance of the user control area 102a may have been or can be set in accordance with menu guidance.

The user interface 606, e.g. the first and/or second display area 102a, 102c, can be controlled by the processor 106f. By way of example, the user interface 606 can have a graphics driver by means of which the screen may have been or can be actuated. Alternatively or additionally, the user interface 606 can have a force feedback system by means of which a mechanical vibration can be transferred onto the user control area 102a, for example by means of the transducer structure 104, in order to signal to the user the detection of his input, for example.

According to various embodiments, the input device 700a can have a support 102 in which at least part of the user interface 606 is integrated. The support 102 can feature for example a glass plate or a toughened plexiglass plate, the underside of which is fitted with at least one screen.

Figure 7B:
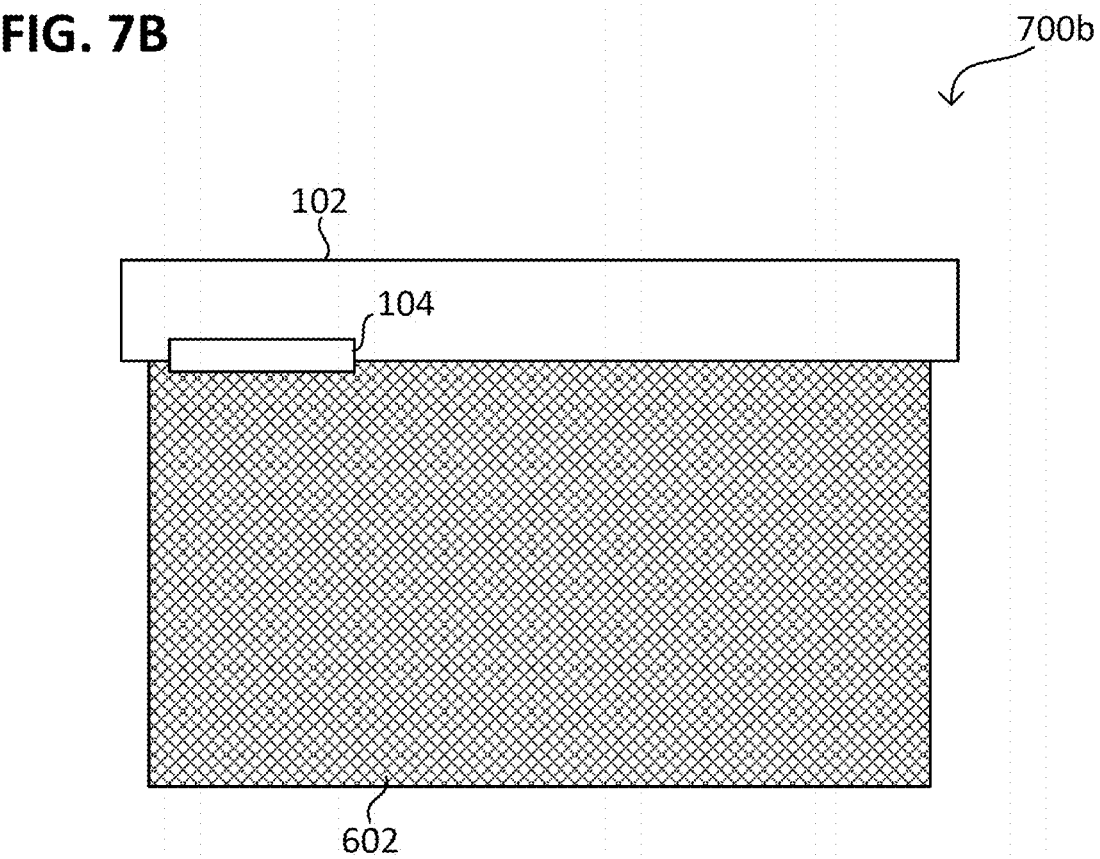
FIG. 7B shows an automated teller machine according to various embodiments in a schematic side view or cross-sectional view.

FIG. 7B illustrates an automated teller machine 700b according to various embodiments in a schematic side view or cross-sectional view.

The transducer structure 104 may be coupled to an underside of the support 102 and to a top of the storage container 602. By way of example, the storage container 602 may be the object 108 to be monitored (cf. FIG. 1B).

Figure 8A:
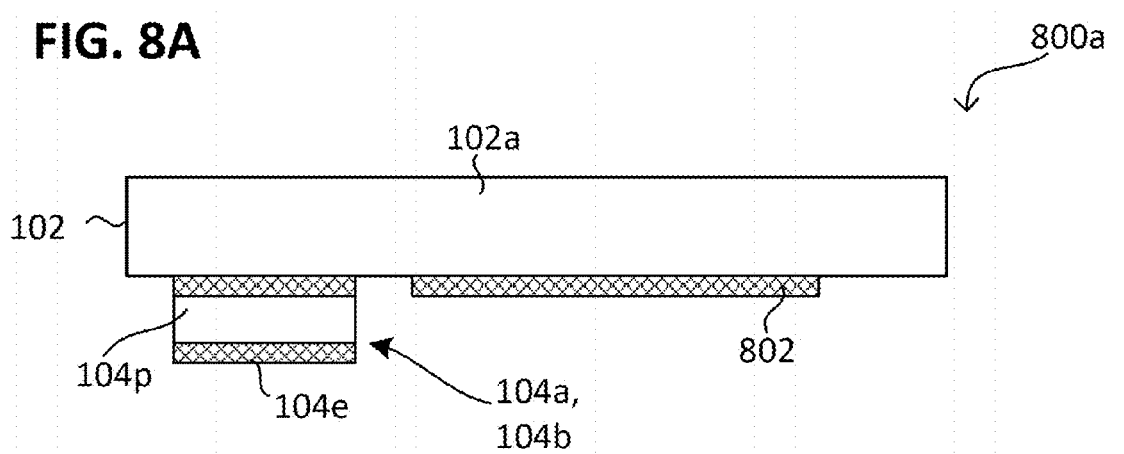
FIG. 8A and FIG. 8B each show an input device according to various embodiments in a schematic plan view or cross-sectional view.

FIG. 8A illustrates an input device 800a according to various embodiments in a schematic side view or cross-sectional view.

Each transducer 104a, 104b of the transducer structure 104 can feature the active material 104p (e.g. a piezoelectric material 104p) and two electrodes 104, by means of which an electrical activity (e.g. a voltage) of the active material 104p can be detected (e.g. in the sensor mode of operation) and/or a voltage can be applied to the active material 104p (e.g. in the actuator mode of operation). The voltage can be transmitted by means of the signal S (e.g. in a manner correlating with the amplitude thereof).

Each transducer 104a, 104b of the transducer structure 104 may have been or can be arranged on an underside of the support 102.

Optionally, a screen 802 having multiple pixels may have been or can be arranged on the underside of the support 102 to display information at the user control area 102a.

Figure 8B:
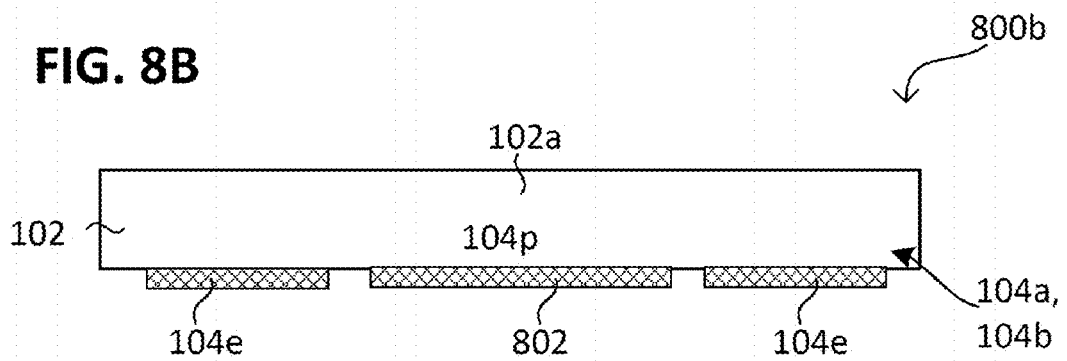

FIG. 8B illustrates an input device 800b according to various embodiments in a schematic side view or cross-sectional view.

Each transducer 104a, 104b of the transducer structure 104 may be configured as in 800a, with the difference that the active material 104p is integrated in the support 102, e.g. monolithically in the support 102. In that case, the active material 104p can feature for example glass (e.g. quartz glass) or be formed therefrom. Therefore, the support 102 itself may be configured to implement the user control function and the integrity monitoring. If the support 102 is damaged and/or manipulated, the functionality of the active material 104p may be disrupted, which can be detected.

Figure 8C:
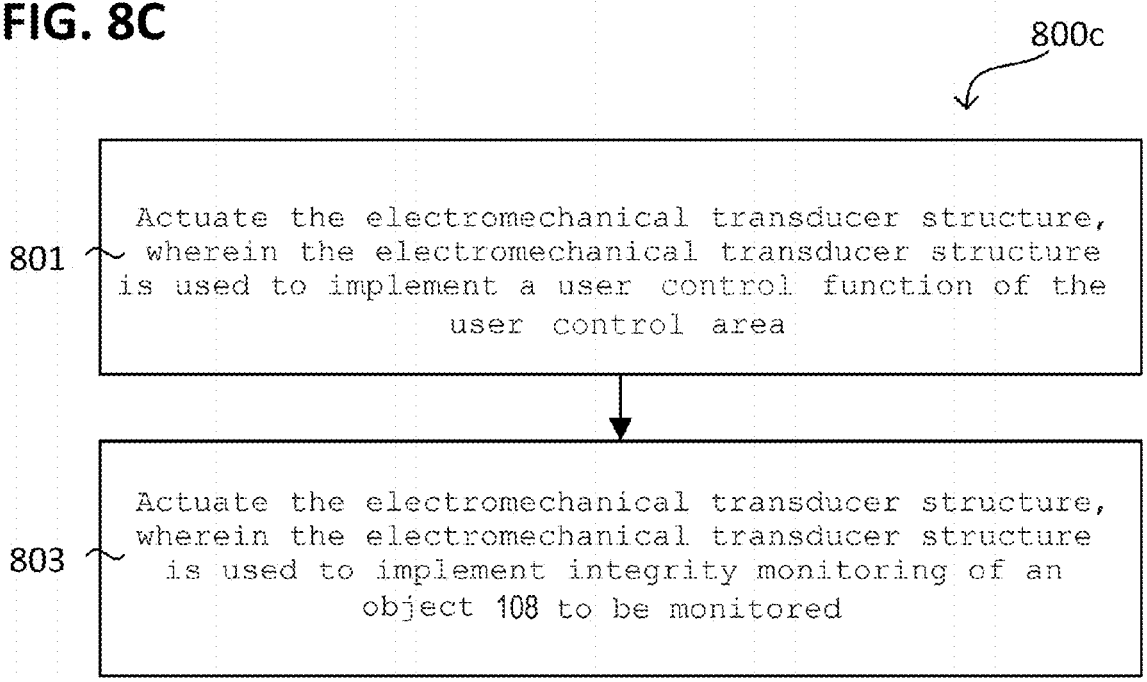
FIG. 8C shows a method according to various embodiments in a schematic flowchart.

FIG. 8C illustrates a method 800c according to various embodiments in a schematic flowchart.

According to various embodiments, the method 800c can involve, in 801: actuating the electromechanical transducer structure, wherein (e.g. in a first mode of operation) the electromechanical transducer structure is used to implement a user control function of the user control area.

According to various embodiments, the method 800c can involve, in 803: actuating the electromechanical transducer structure, wherein (e.g. in a second mode of operation) the electromechanical transducer structure is used to implement integrity monitoring of an object to be monitored (e.g. the storage container 602).

Figure 9:
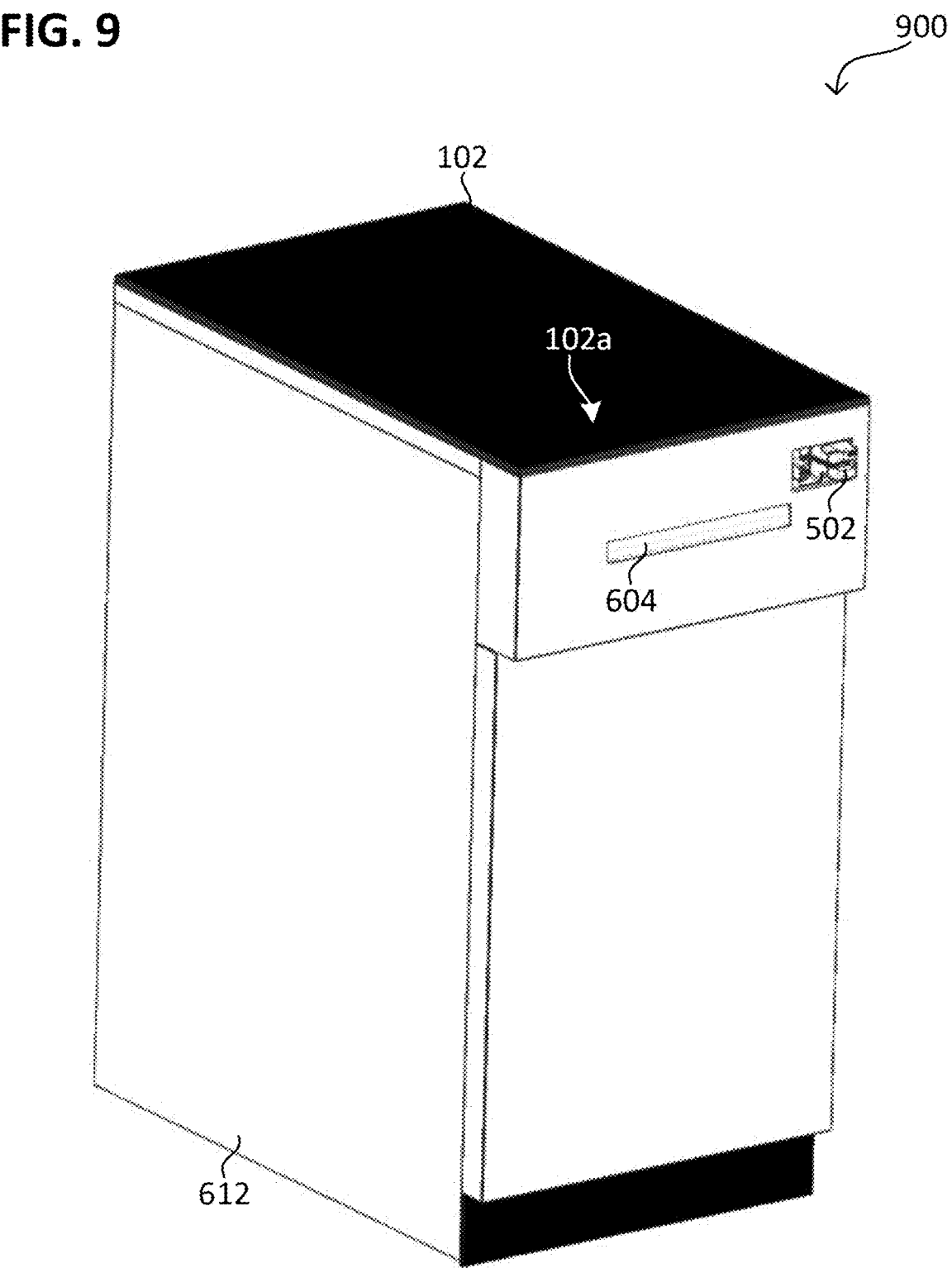
FIG. 9 shows an automated teller machine according to various embodiments in a schematic perspective view.

FIG. 9 illustrates an automated teller machine 900 according to various embodiments in a schematic perspective view and FIG. 10 illustrates the automated teller machine 900 according to various embodiments in a schematic perspective plan view 1000a and a perspective cross-sectional view 1000b in detail.

According to various embodiments, a keypad and/or function symbols can be depicted in the user control area 102a and/or each display area 102c by means of a screen (also referred to as a display) or alternatively or additionally by means of direct imprints. Alternatively or additionally, a projecting method can be used in order to depict a keypad and/or function symbols in the user control area 102a and/or each display area 102c.

According to various embodiments, the user control area 102a can have a keypad, e.g. an encrypting PIN keypad (also referred to as an EPP unit).

The integrity monitoring (also referred to as integrity check) can be effected for example by means of a summation method over a defined period, which summation method is optionally able to be parameterized on the basis of the embodiment of the safe and the installation site (e.g. by means of the profile). By way of example, active integrity monitoring can be effected in an actuator mode of operation (also referred to as the second mode of operation) of at least one piezoelectric sensor 104 with subsequent evaluation.

The same at least one piezoelectric sensor 104 may further have been, or can further be, used in a sensor mode of operation (also referred to as the first mode of operation) to implement the user control function. In other words, the at least one piezoelectric sensor 104 can be used for the operation by the device user. The user control function can involve: evaluation and/or decryption of an input (e.g. a personal identification number, PIN, for authentication). By way of example, the decryption of the sensor signals S, derivation of stochastic features and/or definition of appropriate filters can be effected in the back end of an operator of the automated teller machine 1000 (e.g. a bank).

In other words, all the circuits of the control apparatus 106 do not necessarily have to be integrated in the automated teller machine 1000. Therefore, hardware-based additive security for the EPP unit on the machine may not be absolutely necessary, reducing the costs of said machine.

This allows the at least one piezoelectric sensor 104 to be used to detect a manipulation of the automated teller machine 1000, e.g. when access to the safe is intended to be gained, the automated teller machine 1000 as a whole is intended to be stolen or when a data theft is intended to take place at the automated teller machine 1000.

For the purposes of illustration, an automated teller machine architecture that uses one and the same transducer structure 104 for different functions at the automated teller machine 900 may have been or can be provided according to various embodiments. By way of example, the integrity monitoring of the automated teller machine 900 and a touch and/or EPP functionality can be realized by means of common piezoelectric sensors 104a, 104b.

By way of example, the transducer structure 104 (e.g. a sensor cluster) can be used for different functions such as EPP, safe monitoring and monitoring of the head unit 102. Further, an evaluation to decrypt the input (e.g. the PIN) can take place.

Optionally, the input device of the automated teller machine 900 can have a near field communication interface 1002 and/or a biometric sensor 1004 (e.g. a fingerprint scanner), which transmit data to the control apparatus 106.

Figure 11:
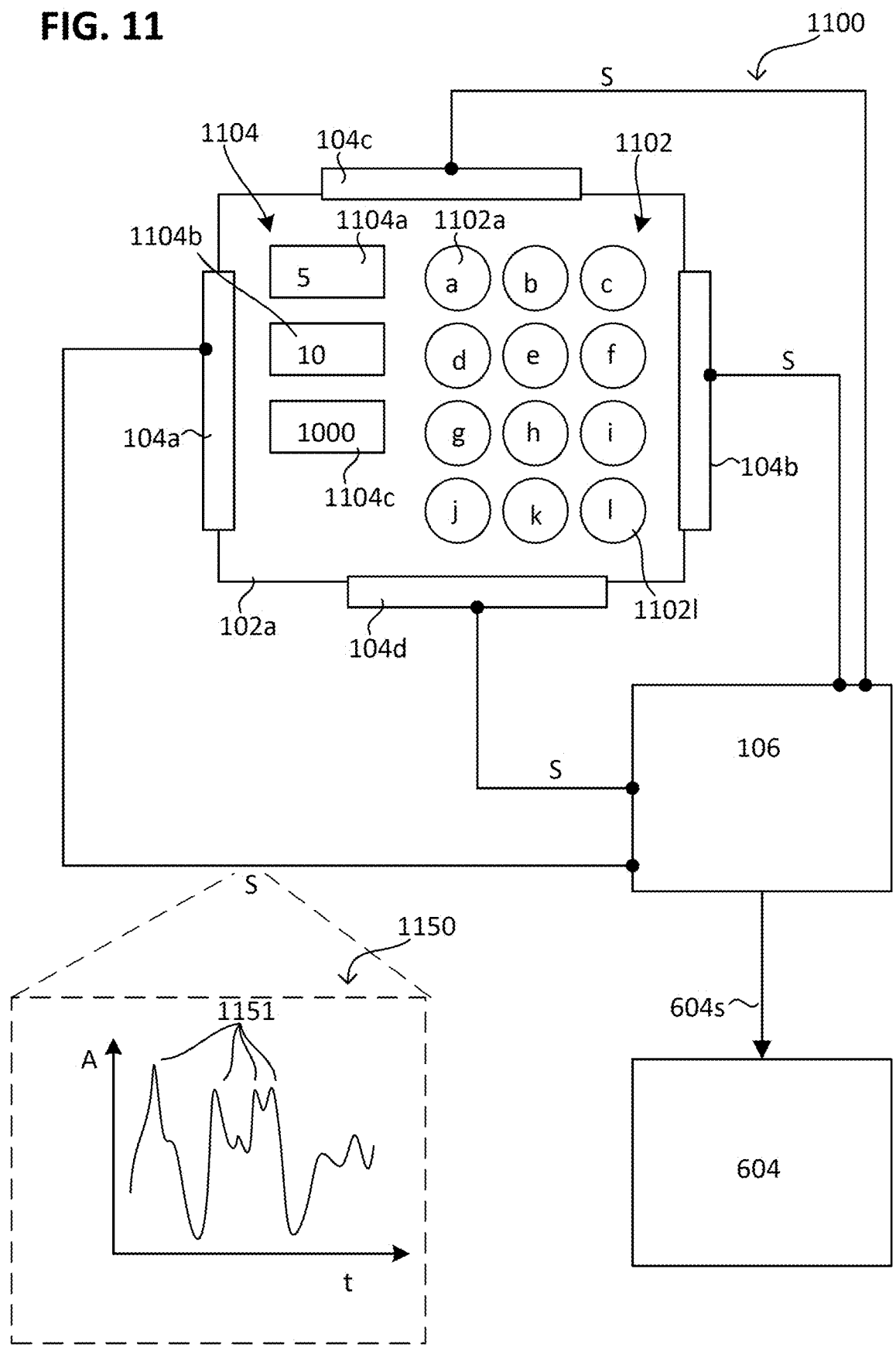
FIG. 11 shows an input device according to various embodiments in a schematic side view or cross-sectional view.

FIG. 11 illustrates an input device 1100 according to various embodiments in a schematic side view or cross-sectional view.

The input device 1100 can have an electromechanical transducer structure 104 that has at least one electromechanical transducer 104a, 104b, 104c, 104d, e.g. four electromechanical transducers 104a, 104b, 104c, 104d, as illustrated in FIG. 11, or fewer electromechanical transducers 104a, 104b, 104c, 104d, e.g. precisely one, two, three electromechanical transducers 104a, 104b, 104c, 104d, or more than four electromechanical transducers 104a, 104b, 104c, 104d. The number of electromechanical transducers 104a, 104b, 104c, 104d may have been or can be matched to the applicable requirements.

The user control area 102a can have multiple input areas, e.g. multiple first input areas 1102a to 1102l and/or multiple second input areas 1104a to 1104b. By way of example, the multiple first input areas 1102a to 1102l can form a keypad 1102 or at least be part thereof. Alternatively or additionally, the multiple second input areas 1104a to 1104b can form a selection field 1104 or at least be part thereof. The keypad 1102 can feature for example an encrypting PIN keypad or be formed therefrom. Each input area of the multiple first input areas 1102a to 1102l may be associated with one key of the keypad 1102, e.g. having a number (e.g. from 1-9). Optionally, there may be provision for input areas for special characters, such as for example hash or star. Each input area 1104a to 1104b of the selection field 1104 of the user control area 102a may be associated with a selection (e.g. a means of payment value) that the user can make, e.g. in accordance with menu guidance.

According to various embodiments, the control apparatus 106 may be configured to capture the sensor signal S provided by each electromechanical transducer 104a, 104b, 104c, 104d of the transducer structure 104.

Further, the control apparatus 106 may be configured to compare the provided electrical sensor signal S (e.g. the temporal characteristic thereof) with multiple reference signals and to take this as a basis for ascertaining an input area of the multiple input areas 1102a to 1102l and 1104a to 1104c in which an input has been provided.

Optionally, the comparing of the sensor signal S with the multiple reference signals can involve the features of these being compared with one another. In that case, the control apparatus 106 may be configured to ascertain features of the electrical sensor signal S (also referred to as signal characteristic) and/or of the multiple reference signals. The ascertaining of features can be effected for example by means of at least one from the following: a transformation, an autocorrelation, a filter, a convolution and/or a moment formation (such as for example expected value and/or variance).

An exemplary temporal characteristic of the sensor signal S (also referred to as electrical signal S in the time domain t) is illustrated in graph 1150, which illustrates the amplitude A of said temporal characteristic (e.g. voltage or current) in a time domain t (also referred to as amplitude/time characteristic). The features can be ascertained on the basis of a temporal characteristic of this kind for the sensor signal S, for example. If the input apparatus is trained, at least one temporal characteristic of the sensor signal S can be stored as reference signal and/or linked to a reference input (e.g. the input event data thereof D(x,y,t)).

By way of example, the temporal characteristic of the sensor signal S can be transformed into a feature space, e.g. into a frequency space and/or by means of a Fourier transformation. In order to obtain as few features as possible, but in exchange so much more relevant features, it is optionally possible for relationships such as covariance and the correlation coefficient between multiple features to be taken into consideration. By way of example, the features taken into consideration can be the times t of multiple instances (e.g. four) of the highest amplitude peaks 1151 of the sensor signal S. Alternatively or additionally, the features taken into consideration can be multiple (e.g. four) most frequently occurring frequencies of the sensor signal S.

On the basis of the features, the relevant input area of the multiple input areas 1102a to 11021 and 1104a to 1104c (e.g. ascertained on the basis of the position of the influence) can be identified. According to various embodiments, the feature comparison can be omitted.

Each usable input area (e.g. each key and/or each selection field) of the user control area 102a may be associated with input event data D(x, y, t) representing a position in the input area. The input event data D(x, y, t) can have at least spatial coordinates (x, y) for the position in the input area and/or can indicate a spatial area within which the input area is arranged.

Use of the user control area 102a by a user can involve for example a signal input (e.g. pressing a key) that represents simple input information, for example. Alternatively or additionally, the use can involve a series of inputs (which are linked to one another, for example) that represents complex input information (e.g. a multidigit number), for example.

For the purposes of illustration, the control apparatus 106 may be configured to use the amplitude/time characteristic of the sensor signal S of each input to infer the underlying input information E.

By way of example, a user can authenticate himself by means of the input (e.g. by means of the input of a personal identification number). The control apparatus 106 may be configured to check whether the authentication was successful, and, if the authentication was successful, to prompt a requested means of payment to be dispensed and/or a means of payment for deposit to be taken, e.g. by means of the transfer unit 604.

Figure 12:
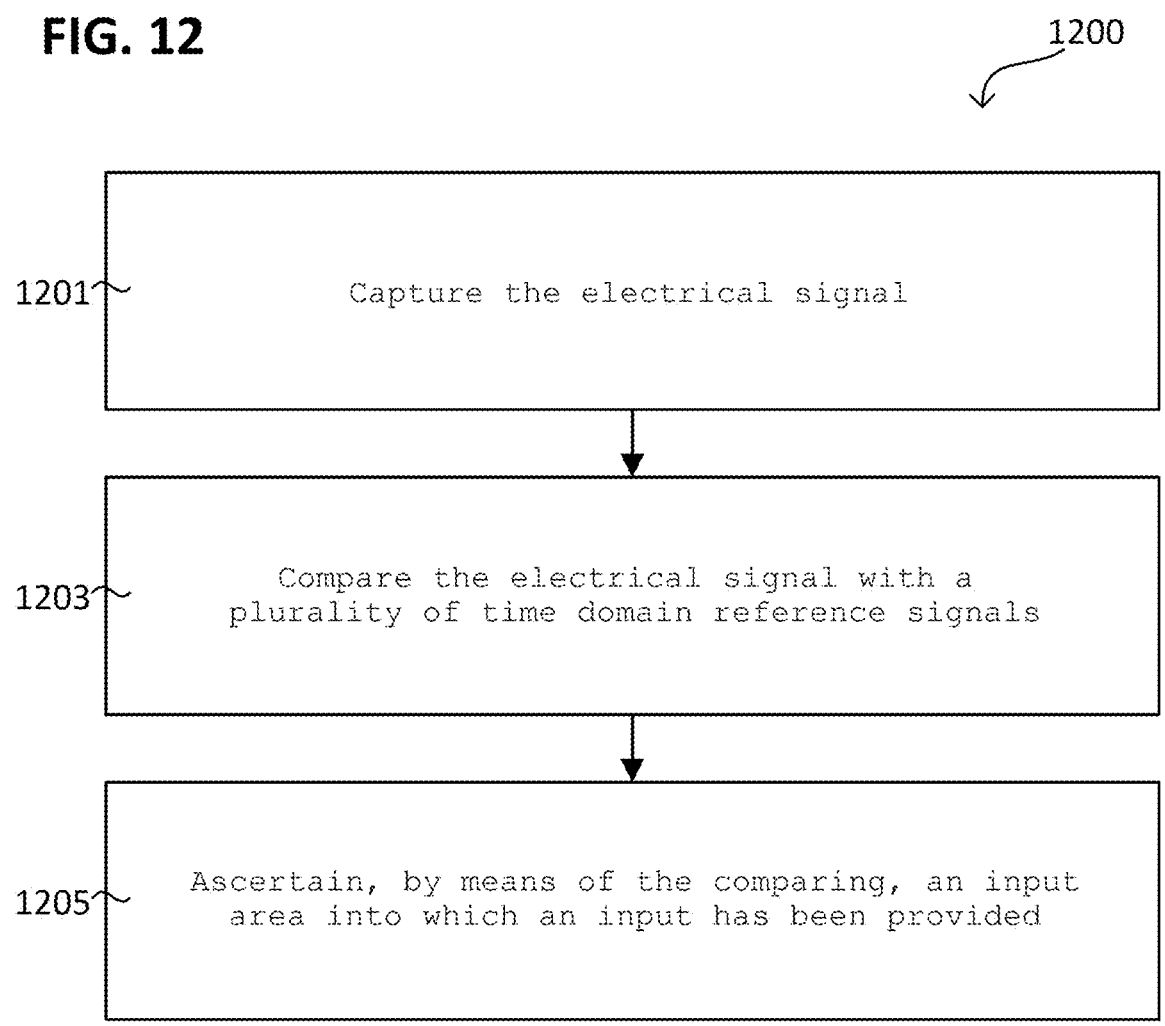
FIG. 12 shows a method according to various embodiments in a schematic flowchart.

FIG. 12 illustrates a method 1200 according to various embodiments in a schematic flowchart, e.g. for the operation of an input device.

According to various embodiments, the method 1200 can involve, in 1201: capturing the electrical signal.

The method 1200 can further involve, in 1203: comparing the electrical signal with a plurality of time domain reference signals.

The method 1200 can further involve, in 1205: ascertaining, by means of the comparing, an input area into which an input has been provided.

For the purposes of illustration, for example virtual keypad areas may have been or can be defined that correspond to the input areas. The time response of the electrical signal can be used to infer the input area at which the input is provided. By way of example, the user control area can have a metal plate or be part thereof, on which the virtual keypad areas are arranged and/or marked.

The invention claimed is:

1. An input device comprising:
a support that has a plate-shaped user control area formed from a transparent material and that has a coupling area for coupling an object to be monitored to the input device;
an electromechanical transducer structure that is coupled both to the user control area and to the coupling area, and that features an electromechanically active material that is monolithically integrated in the support; and
a control apparatus that uses the electromechanical transducer structure to both implement a user control function of the user control area and further to implement mechanical integrity monitoring of the object to be monitored.

2. The input device according to claim 1,
wherein the control apparatus includes a measuring circuit that is configured to capture data by the electromechanical transducer structure, and
wherein the captured data are used to implement the user control function and to implement the integrity monitoring.

3. The input device according to claim 2,
wherein the control apparatus includes an excitation circuit that is configured to implement mechanical excitement of the object to be monitored, and
wherein the integrity monitoring is effected on the basis of a response to the mechanical exciting, and
wherein the the measuring circuit is configured to use the transducer structure to capture the response and the excitation circuit is configured to use the transducer structure to mechanically excite the support.

4. The input device according to claim 1,
wherein the control apparatus is configured to detect damage and manipulation to the object to be monitored when a result of the integrity monitoring satisfies a predefined criterion.

5. The input device according to claim 1,
wherein the transducer structure is configured to convert an external influence on the user control area into an electrical output variable; and
wherein the control apparatus is configured to ascertain a spatial and temporal characteristic of the external influence on the basis of the electrical output variable.

6. The input device according to claim 1,
wherein the electromechanically active material is integrated in the support and coupled thereto by adhesive bonding.

7. The input device according to claim 6, wherein the electromechanically active material is piezoelectric.

8. The input device according to claim 1, wherein the support is formed from silicon oxide.

9. The input device according to claim 1,
wherein the electromechanically active material is integrated in the support and coupled thereto by printing.

10. The input device according to claim 9, wherein the electromechanically active material is piezoelectric.

11. The input device according to claim 1, wherein the support is formed from polymethylmethacrylate.

12. An automated teller machine comprising:
a storage container for holding a means of payment;
a transfer unit for transferring the means of payment to the storage container or from the storage container;
an input device having:
a support that has a plate-shaped user control area formed from a transparent material and that has a coupling area for coupling an object to be monitored to the input device;
an electromechanical transducer structure that is coupled both to the user control area and to the coupling area, and that features an electromechanically active material that is monolithically integrated in the support; and a control apparatus that uses the electromechanical transducer structure to implement a user control function of the user control area and further to implement mechanical integrity monitoring of the object to be monitored and the support;

wherein the storage container is coupled to the coupling area of the input device.

13. An automated teller machine comprising:

a storage container for holding means of payment;

a transfer unit for transferring the means of payment to the storage container or from the storage container;

a user interface that has a plate-shaped user control area formed from a transparent material, an electromechanical transducer structure that is coupled both to the storage container and to the user interface, and that features an electromechanically active material that is monolithically integrated in the user interface; and a control apparatus that uses the electromechanical transducer structure to implement a user control function of the user interface and to implement mechanical integrity monitoring of the storage container and the user interface.

14. An input device comprising:

a plate-shaped user control area formed from a transparent material having one or more input areas;

an electromechanical transducer structure that features an electromechanically active material that is monolithically integrated in the user control area and is configured to convert an external influence on the user control area into an electrical signal in the time domain; and an ascertainment device including a measuring circuit that is configured to capture the electrical signal and configured to use comparing of the electrical signal with a plurality of time domain reference signals to ascertain an input area into which an input has been provided, wherein each time domain reference signal represents a reference input into a respectively associated input area of the one or more input areas.

15. A method for operating an input device, wherein the input device has:

a plate-shaped user control area formed from a transparent material having one or more input areas;

an electromechanical transducer structure that features an electromechanically active material that is monolithically integrated in the user control area and that is configured to convert an external influence on the user control area into an electrical signal in the time domain;

wherein the method comprises:

capturing the electrical signal;

comparing the electrical signal with a plurality of time domain reference signals; and ascertaining, by said comparing, an input area into which an input has been provided, wherein each time domain reference signal represents a reference input into a respectively associated input area of the one or more input areas.

16. The method of claim 15, where a nonvolatile data memory has code segments that are executed by a processor to carry out the method according to claim 15.

17. The method of claim 15, wherein the electromechanical transducer structure is utilized to implement mechanical integrity monitoring.

18. A method for operating an electromechanical transducer structure that features an electromechanically active material that is monolithically integrated in a plate-shaped user control area formed from a transparent material and that is coupled both to the user control area and to an object to be monitored, comprising:

actuating the electromechanical transducer structure, wherein the electromechanical transducer structure is used to implement a user control function of the user control area; and actuating the electromechanical transducer structure, wherein the electromechanical transducer structure is used to implement integrity monitoring of an object to be monitored.

\* \* \* \* \*